US011042283B2

(12) United States Patent
Balakrishnan et al.

(10) Patent No.: US 11,042,283 B2
(45) Date of Patent: *Jun. 22, 2021

(54) NAVIGATING GALLERIES OF DIGITAL CONTENT

(71) Applicant: DROPBOX, INC., San Francisco, CA (US)

(72) Inventors: Ramesh Balakrishnan, San Francisco, CA (US); Yi Wei, San Francisco, CA (US); Joshua Puckett, Mountain View, CA (US); Brian Smith, San Francisco, CA (US); Andrew Scheff, San Francisco, CA (US); Rajeev Nayak, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 16/119,858

(22) Filed: Aug. 31, 2018

(65) Prior Publication Data
US 2018/0373420 A1 Dec. 27, 2018

Related U.S. Application Data

(63) Continuation of application No. 14/248,238, filed on Apr. 8, 2014, now Pat. No. 10,095,398.
(Continued)

(51) Int. Cl.
*G06F 3/048* (2013.01)
*G06F 3/0485* (2013.01)
(Continued)

(52) U.S. Cl.
CPC ........ *G06F 3/04855* (2013.01); *G06F 3/0482* (2013.01); *G06F 16/248* (2019.01);
(Continued)

(58) Field of Classification Search
CPC ...... G06F 3/048; G06F 3/04855; G06F 16/54; G06F 16/248; G06F 16/24578;
(Continued)

(56) References Cited

U.S. PATENT DOCUMENTS 5,673,401 A 9/1997 Volk et al.
5,819,032 A 10/1998 de Vries et al.
(Continued)

OTHER PUBLICATIONS

U.S. Appl. No. 14/248,235, May 9, 2016, Office Action.
(Continued)

*Primary Examiner* — Pei Yong Weng
(74) *Attorney, Agent, or Firm* — Keller Jolley Preece

(57) ABSTRACT

One or more embodiments of the present disclosure include a content navigation system that allows a user to search, browse, and otherwise experience a collection of digital content items. For example, the content navigation system can provide a graphical user interface including a scroll element. One or more embodiments of the scroll element can include various navigational functions that provide a user-friendly interface for browsing and experiencing a collection of digital content items. Furthermore, the content navigation system can provide methods and systems for a user to easily configure the way in which the digital content items are organized within the user interface, thereby customizing the user's browsing experience.

20 Claims, 17 Drawing Sheets

Related U.S. Application Data

(60) Provisional application No. 61/945,819, filed on Feb. 27, 2014.

(51) Int. Cl.
*G06F 3/0482* (2013.01)
*G06F 16/54* (2019.01)
*G06F 16/248* (2019.01)
*G06F 16/2457* (2019.01)
*H04L 29/08* (2006.01)
*H04N 21/431* (2011.01)

(52) U.S. Cl.
CPC ........ *G06F 16/24578* (2019.01); *G06F 16/54* (2019.01); *H04L 67/02* (2013.01); *H04L 67/10* (2013.01); *H04N 21/4316* (2013.01)

(58) Field of Classification Search
CPC ....... G06F 3/0482; H04L 67/02; H04L 67/10; H04N 21/4316
See application file for complete search history.

(56) References Cited

U.S. PATENT DOCUMENTS

| | | | |
|---|---|---|---|
| 6,366,303 B1 | 4/2002 | Venolia | |
| 6,671,405 B1 | 12/2003 | Savakis et al. | |
| 6,937,254 B2 | 8/2005 | Nishiyama et al. | |
| 6,976,228 B2 | 12/2005 | Bernhardson | |
| 7,437,005 B2 | 10/2008 | Drucker et al. | |
| 7,587,683 B2 | 9/2009 | Ito et al. | |
| 7,634,740 B2 | 12/2009 | Enomoto et al. | |
| D622,729 S | 8/2010 | Oda et al. | |
| 7,877,317 B2 | 1/2011 | Chow | |
| 7,970,240 B1 | 6/2011 | Chao et al. | |
| 8,237,712 B2 | 8/2012 | Fagans | |
| 8,249,397 B2 | 8/2012 | Wood et al. | |
| 9,111,014 B1 | 8/2015 | Brown et al. | |
| 9,372,829 B1 | 6/2016 | Rahmani et al. | |
| 9,836,205 B2 | 12/2017 | Balakrishnan et al. | |
| 10,346,023 B2 | 7/2019 | Underwood et al. | |
| 2001/0043279 A1 | 11/2001 | Niikawa et al. | |
| 2003/0076301 A1 | 4/2003 | Tsuk et al. | |
| 2005/0289482 A1* | 12/2005 | Anthony | G06F 3/04815 715/851 |
| 2006/0090141 A1 | 4/2006 | Loui et al. | |
| 2007/0074109 A1 | 3/2007 | Nagahara et al. | |
| 2007/0209025 A1 | 9/2007 | Jing et al. | |
| 2008/0052945 A1 | 3/2008 | Matas et al. | |
| 2008/0235205 A1 | 9/2008 | Fein et al. | |
| 2009/0019031 A1 | 1/2009 | Krovitz et al. | |
| 2009/0064029 A1 | 3/2009 | Corkran et al. | |
| 2009/0171783 A1 | 7/2009 | Raju | |
| 2009/0254855 A1 | 10/2009 | Kretz et al. | |
| 2009/0265334 A1 | 10/2009 | Narayanan et al. | |
| 2010/0085306 A1 | 4/2010 | Wu | |
| 2010/0095239 A1* | 4/2010 | McCommons | G06F 3/04855 715/784 |
| 2010/0229115 A1 | 9/2010 | Augustine et al. | |
| 2010/0251165 A1 | 9/2010 | Williams | |
| 2011/0083167 A1 | 4/2011 | Carpenter et al. | |
| 2011/0225549 A1 | 9/2011 | Kim et al. | |
| 2011/0252357 A1 | 10/2011 | Chaudhri | |
| 2011/0265002 A1* | 10/2011 | Hong | G06F 3/04855 715/702 |
| 2012/0042279 A1* | 2/2012 | Naderi | G06F 3/04855 715/786 |
| 2012/0084731 A1 | 4/2012 | Filman et al. | |
| 2012/0110509 A1 | 5/2012 | Isozu et al. | |
| 2012/0198386 A1 | 8/2012 | Hautala et al. | |
| 2013/0016113 A1 | 1/2013 | Adhikari et al. | |
| 2013/0176256 A1* | 7/2013 | Hara | G06F 3/0485 345/173 |
| 2013/0179837 A1 | 7/2013 | Eriksson et al. | |
| 2013/0222431 A1 | 8/2013 | Joo et al. | |
| 2013/0318476 A1 | 11/2013 | Sauve et al. | |
| 2013/0332068 A1 | 12/2013 | Kesar et al. | |
| 2014/0013271 A1 | 1/2014 | Moore et al. | |
| 2014/0123005 A1 | 5/2014 | Forstall et al. | |
| 2014/0125856 A1 | 5/2014 | Kim et al. | |
| 2014/0149936 A1 | 5/2014 | Wilder et al. | |
| 2014/0282099 A1 | 9/2014 | Bronder et al. | |
| 2014/0337791 A1 | 11/2014 | Agnetta et al. | |
| 2014/0344750 A1 | 11/2014 | Takahashi et al. | |
| 2015/0019545 A1 | 1/2015 | Chedeau et al. | |
| 2015/0039616 A1 | 2/2015 | Rolston et al. | |
| 2015/0058708 A1 | 2/2015 | Georgiev | |
| 2015/0058754 A1 | 2/2015 | Rauh | |
| 2015/0062097 A1 | 3/2015 | Chung et al. | |
| 2015/0161205 A1 | 6/2015 | Beach et al. | |
| 2015/0212666 A1 | 7/2015 | Daniel et al. | |
| 2015/0242110 A1 | 8/2015 | Balakrishnan et al. | |
| 2015/0242404 A1 | 8/2015 | Underwood et al. | |
| 2018/0059926 A1 | 3/2018 | Balakrishnan et al. | |

OTHER PUBLICATIONS

U.S. Appl. No. 14/248,235, Oct. 6, 2016, Office Action.
U.S. Appl. No. 14/248,235, Apr. 25, 2017, Office Action.
U.S. Appl. No. 14/248,235, Oct. 23, 2017, Office Action.
U.S. Appl. No. 14/248,235, Mar. 7, 2018, Office Action.
U.S. Appl. No. 14/248,238, Jun. 13, 2016, Office Action.
U.S. Appl. No. 14/248,238, Oct. 25, 2016, Office Action.
U.S. Appl. No. 14/248,238, Feb. 17, 2017, Office Action.
U.S. Appl. No. 14/248,238, Jun. 6, 2017, Office Action.
U.S. Appl. No. 14/248,238, Oct. 10, 2017, Office Action.
U.S. Appl. No. 14/248,238, Feb. 1, 2018, Office Action.
U.S. Appl. No. 14/248,238, May 31, 2018, Notice of Allowance.
U.S. Appl. No. 14/520,210, Feb. 9, 2017, Office Action.
U.S. Appl. No. 14/520,210, Aug. 1, 2017, Notice of Allowance.
U.S. Appl. No. 15/801,301, Aug. 7, 2019, Notice of Allowance.
U.S. Appl. No. 14/248,235, Feb. 25, 2019, Notice of Allowance.
U.S. Appl. No. 15/801,301, Apr. 18, 2019, Office Action.
U.S. Appl. No. 14/248,235, Oct. 25, 2018, Office Action.
Notice of Allowance from U.S. Appl. No. 14/580,189, dated Sep. 30, 2019, 10 pages.
Non-Final Office Action from U.S. Appl. No. 16/425,627, dated Nov. 25, 2020, 21 pages.
Final Office Action from U.S. Appl. No. 16/425,627, dated May 3, 2021, 18 pages.

\* cited by examiner

NAVIGATING GALLERIES OF DIGITAL CONTENT

CROSS REFERENCE TO RELATED APPLICATIONS

This application is a continuation of application Ser. No. 14/248,238 entitled "Navigating Galleries of Digital Content" and filed on Apr. 8, 2014 and claims the benefit of U.S. Provisional Application 61/945,819 entitled "Navigating Galleries of Digital Content," filed Feb. 27, 2014, each of which is expressly incorporated by reference herein in its entirety.

BACKGROUND

1. Technical Field

One or more embodiments of the present disclosure relate generally to systems and methods for navigating a collection of digital content items. More specifically, one or more embodiments of the present disclosure relate to systems and methods of providing a graphical user interface that allows a user to interact with a collection of digital content items.

2. Background and Relevant Art

Computing devices (e.g., computers, tablets, smart phones) provide numerous ways for people to capture, create, share, view, and otherwise interact with numerous types of digital content items. For example, computing devices allow users to interact with digital photos by capturing, sharing, and viewing digital photos. Overtime, a typical user can amass a large amount of digital content items. As the number of digital content items increases, it becomes more difficult for a user to interact with the digital content items in an efficient and enjoyable manner. In particular, conventional systems for presenting digital content items often incorporate user interfaces that have several disadvantages.

For example, many conventional user interfaces do not allow a user to efficiently navigate through a large number of digital content items. In particular, many conventional user interface designs may allow a user to browse digital content items by providing a grid of digital content items (e.g., digital photos) through which a user may navigate. For example, a typical grid interface may require that a user manually scroll through the grid to locate a particular digital content item. The amount of scroll through the grid is typically directly proportional to the user's input. As such, when the grid includes thousands, or perhaps tens of thousands, of digital content items, the process of scrolling through the grid can be time consuming and inefficient, and therefore, frustrate the user.

The difficulties associated with conventional grid interfaces are often compounded when using a handheld device. In particular, handheld devices, such as mobile phones, typically have a limited screen size. The limited screen size can require a user to scroll the entire screen height of the screen to browse just a couple of digital content items. As such, attempting to browse through thousands of items using a conventional grid interface on a handheld device can be overwhelming.

Furthermore, conventional grid interfaces are typically presented in a vertical arrangement. As such, in order to scroll through a vertical interface, the user typically may provide a vertical scroll interaction. When using a handheld device with a single hand, providing a vertical scroll motion can be difficult. For example, attempting to scroll with a thumb of a hand holding the device can be ergonomically awkward. Often a user may not be able to provide a vertical scroll interaction over the entire height of the handheld device screen using only one hand. As such, users attempting to browse a conventional grid interface on a handheld device often have to use two hands.

In addition to the above drawbacks, many conventional systems used for presenting digital content items are limited in the way in which the digital content items can be organized and/or arranged. For example, and especially in the case of mobile computing devices, many conventional grid interfaces do not categorize, group, or arrange the numerous digital content items in any order. This causes the user to feel overwhelmed by the amount of digital content items the user will be forced to view in an attempt to find a particular digital content item. Although some conventional grid interfaces attempt to organize the digital content items, the user typically does not have a choice in how the digital content items are organized or arranged within the grid interface.

Accordingly, there is a need for a system that provides a user with an enjoyable user experience when navigating through digital content items.

SUMMARY

The principles described herein provide benefits and/or solve one or more of the foregoing or other disadvantages in the art with methods and systems for browsing and navigating digital content items. In particular, one or more embodiments provide a graphical user interface that, when presented on a handheld device, allows a user to easily interact with the graphical user interface using a hand holding the handheld device. For example, in one or more embodiments the graphical user interface includes an interactive scroll element oriented in a first direction (e.g., horizontal direction) that when activated scrolls through digital content items in a second direction (e.g., vertical direction). The interactive scroll element of the graphical user interface can allow a user of the handheld device to use the graphical user interface in an ergonomically comfortable manner. For example, the user can hold the handheld device in one hand, and easily interact with the graphical user interface using the thumb of the hand holding the device to navigate or browse the digital content items.

Additionally, one or more embodiments provide a graphical user interface that allow a user to easily and efficiently browse and navigate a large collection of digital content items in an enjoyable manner. In particular, in one or more embodiments includes a scroll function that is based at least partially upon the size of the collection of digital content items. For example, in embodiments having a large digital content collection, the systems and methods described herein can provide a faster scroll rate to allow the user to quickly navigate through the larger collection. On the other hand, in embodiments having a smaller digital content collection, the systems and methods described herein can provide a slower scroll rate. Thus, one or more embodiments of the user interface provide functionality to browse digital content items at a slow rate to allow the user to experience and enjoy the digital content items. Additionally, the same user interface permits a user to navigate through the digital content items at a fast rate, which in turn allows the user to easily navigate past large numbers of digital content items in which the user is not currently interested.

For example, the systems and methods described herein provide a user interface that intuitively organizes the collection of digital content items so that a user, knowing one or more characteristics of a particular digital content item, can quickly locate the particular digital content item. For instance, if the user knows an approximate timeframe within which a digital photo was taken, the systems and methods described herein provide a user interface that allows the user to quickly navigate through the large collection of digital content items and locate the digital photo. In one or more embodiments, the digital content items can be organized or arranged within the graphical user interface using a variety of organizational techniques that allow a user to experience and enjoy the digital content items in a variety of different ways. In particular, the methods and systems described herein provide the user with the ability to organize a collection of digital content items based on one or more of several digital content item characteristics or attributes. Thus, one or more embodiments of the present invention provide a graphical user interface that allows the user to select between one or more organizational modes to customize the user experience when navigating a collection of digital content items.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
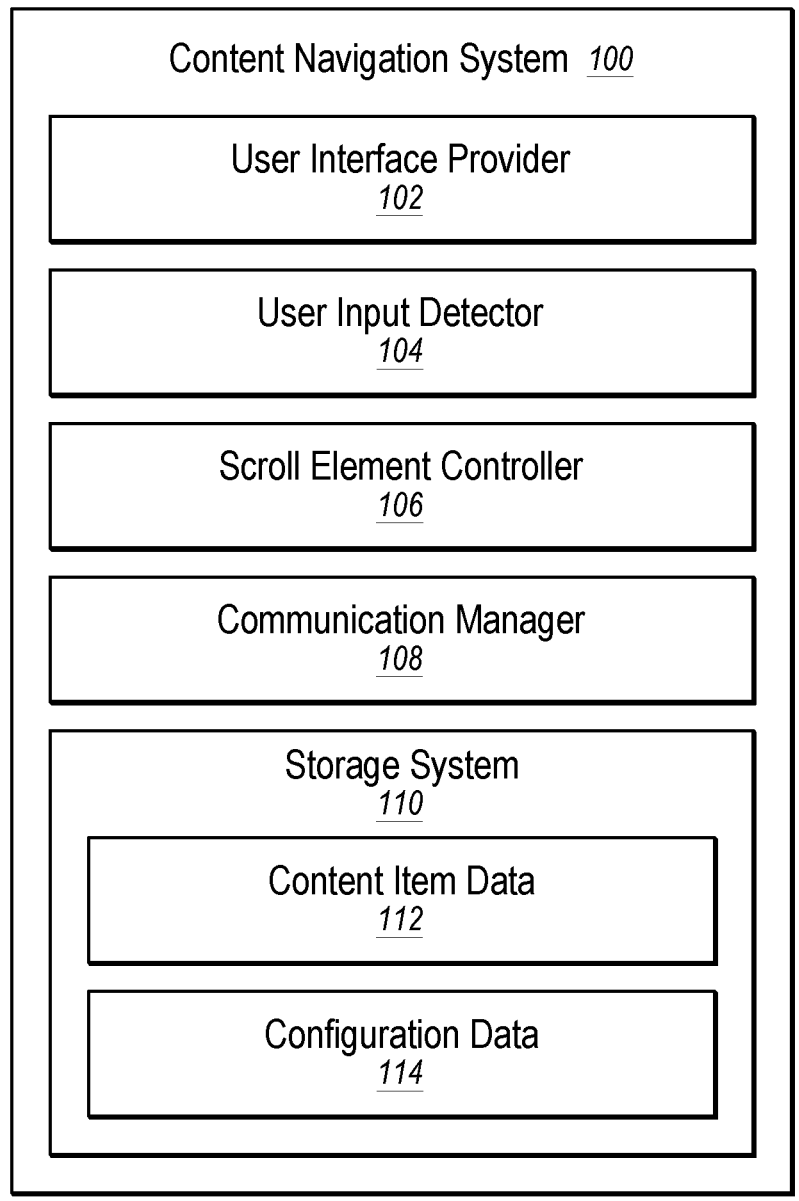
FIG. 1 illustrates a schematic diagram of a content navigation system in accordance with one or more embodiments.

One or more embodiments include a content navigation system that allows a user to search, browse, and otherwise experience a collection of digital content items. For example, the content navigation system can provide a graphical user interface (or "user interface") including a scroll element that allows a user to quickly locate a particular digital content item from within a collection of digital content items. In particular, one or more embodiments provide a graphical user interface that, when presented on a handheld device, allows a user to interact and control the graphical user interface in an ergonomically comfortable manner. For example, in one or more embodiments the graphical user interface includes an interactive scroll element oriented in a first direction (e.g., horizontal direction) that when activated scrolls through digital content items in a second direction (e.g., vertical direction). The configuration of the user interface and the scroll element can provide an ergonomically advantageous design that allows the user to hold the handheld device and to navigate and browse a collection of digital content with the same hand.

Additionally, one or more embodiments provide a graphical user interface that allow a user to easily and efficiently browse and navigate a large collection of digital content items. In particular, in one or more embodiments includes a scroll function that is based at least partially upon the size of the collection of digital content items. For example, in embodiments having a large digital content collection, the systems and methods described herein can provide a faster scroll rate to allow the user to quickly navigate through the larger collection. Thus, a user can easily navigate past large numbers of digital content items in an effect to go to a particular point in the collection. On the other hand, in embodiments having a smaller digital content collection, the systems and methods described herein can provide a slower scroll rate. Thus, one or more embodiments of the user interface provide functionality to browse digital content items at a slow rate to allow the user to experience and enjoy the digital content items.

More specifically, systems and methods disclosed herein can provide a content navigation system that allows a user to easily locate a particular content item. For example, the content navigation system can provide a user interface that includes a view area wherein digital content items are presented. The user interface can further include a scroll element with which a user can interact to navigate through a collection of digital content items presented in the view area.

In one or more embodiments, the content navigation system can determine or otherwise provide a control ratio between the scroll element and the digital content items presented in the view area. Based on the control ratio, a slight user interaction with the scroll element can be amplified to cause a scaled navigational response to the digital content items presented in the view area. Thus, a user can interact with the scroll element to quickly and efficiently browse or navigate through a large collection of digital content items to locate a particular digital content item.

For instance, a user may want to locate a particular digital photo. The user may know an approximate timeframe within which the particular digital photo was taken. One or more embodiments of the content navigation system can organize the digital content items within the view area based on the time/date the digital content item was created (e.g., when the user took the digital photo). In other words, the content navigation system can organize the digital content items in a timeline order for presentation within the view area of the user interface.

Regardless of the time/date of the digital content items presented within the view area at a particular moment, the user can interact with the scroll element to efficiently navigate to the timeframe corresponding to the particular digital photo the user wants to locate. For example, due to the control ratio associated with the scroll element, the user can quickly navigate past thousands of digital content items, representing several years of collected digital content, and quickly navigate to the known timeframe. Once the user navigates to the known timeframe, the user interface can further allow the user to browse the digital content items within the timeframe at an appropriate rate for identifying and finding the particular digital photo, as will be discussed further below.

In addition, and as mentioned above, one or more embodiments of the content navigation system can provide an intuitive user interface that allows a user to browse and experience digital content items in an enjoyable manner. For example, the user interface can include a scroll element having various navigational functions. The navigational functions of the scroll element allow a user to intuitively understand how to navigate and browse the user's content items. In particular, the scroll element provides a constant visual indication to the user of the portion of the user's collection of digital content items that is presented in the view area. In addition, the scroll element can provide options to allow the user to jump quickly to a next section of the user's collection of digital content items.

In addition to the various navigation and browsing functions generally described above, the content navigation system can also organize and/or arrange digital content items to enhance the ease of use, as well and the enjoyment of the content navigation system. In particular, one or more embodiments of the content navigation system allow the user to customize the organization and/or arrangement of digital content items. For example, not only can the content navigation system organize the digital content items by date of creation, but the content navigation system can also organize using other characteristics of the digital content items. For instance, the content navigation system can organize digital content items based on actual content, type, user assigned characteristic(s), and/or other digital content item characteristics or attributes. Additional features, benefits, and advantages of the content navigation system will be described in further detail below with reference to the figures.

As used herein, a "digital content item" (or simply "content item") refers to digital data. In one or more embodiments, a content item can include a data file. Additional examples of content items include, but are not limited to, digital photos, digital video, digital audio, document files of all types, streaming content, contact lists, and/or folders that include one or more digital content items.

A "collection of digital content items" (or simply "collection"), as used herein, refers to one or more content items associated with one or more users. A collection can include a single type of content item or multiple different types of content items. In addition, a collection can include as few as one content item, but in many instances, a collection can include large numbers of content items.

As used herein, "navigate" or "navigation" refers to an act, function, and/or operation performed in response to user interaction indicating a user's desire to view a portion of a collection that is not presented, or is not about to be presented, on a display screen at a given moment. For example, navigation can include, but is not limited to, scrolling through large numbers of content items at a rate to quickly move from viewing one portion of a collection to viewing another portion of a collection. Generally, for example, a user can implement navigation functions to locate a particular group of content items, or a particular content item, within a collection of content items, and therefore, the user desires to "skip over" large numbers of content items.

In contrast, "browse" or "browsing," as used herein, refers to an act, function, and/or operation performed in response to user interaction indicating a user's desire to experience the substance of content items. For example, browsing can include, but is not limited to, scrolling through one or more content items at a rate that allows a user to enjoy the substance of the content items. For example, when a user wishes to view and enjoy digital photos, the user can browse through the digital photos.

FIG. 1 illustrates an example embodiment of content navigation system 100 (or simply "navigation system 100"). As shown, navigation system 100 may include, but is not limited to, user interface provider 102, user input detector 104, scroll element controller 106, communication manager 108, and storage system 110. Each of the components 102-110 of navigation system 100 may be in communication with one another using any suitable communication technologies. It will be recognized that although components 102-110 are shown to be separate in FIG. 1, any of components 102-110 may be combined into fewer components, such as into a single component, or divided into more components as may serve a particular embodiment. In addition, components 102-110 may be located on, or implemented by, one or more computing devices, such as those described below in relation to FIG. 12. Alternatively, portions of navigation system 100 can be located on a computing device, while other portions of navigation system 100 are located on online content management system, such as that described below in reference to FIG. 13.

Components 102-110 can comprise software, hardware, or both. For example, components 102-110 can comprise one or more instructions stored on a computer-readable storage medium and executable by processors of one or more computing devices. When executed by the one or more processors, the computer-executable instructions of navigation system 100 can cause a computing device to perform the methods described herein. Alternatively, components 102-110 can comprise hardware, such as a special purpose processing device to perform a certain function or group of functions. Additionally or alternatively, components 102-110 can comprise a combination of computer-executable instructions and hardware.

As mentioned above, and as shown in FIG. 1, navigation system 100 can include user interface provider 102. User interface provider 102 may be configured to provide, manage, and/or control a user interface that allows a user to navigate, browse, view, share, manage, and/or otherwise experience a collection of content items using navigation system 100. For example, user interface provider 102 can provide a user interface configured to facilitate a presentation of a collection of content items on a computing device. Likewise, user interface provider 102 can provide a user interface configured to facilitate navigation through the collection, as well as browsing of the content items.

More specifically, user interface provider 102 may provide (e.g., by way of a display screen associated with a computing device) a variety of interactive elements within the user interface. For example, user interface provider 102 may cause a computing device to present a plurality of graphical objects that represent content items. For instance, and as briefly discussed above, user interface provider 102 can present reduced-size versions of content items, such as thumbnails or icons. In one or more example embodiments, user interface provider 102 can present reduced-size versions of content items in a gallery formatted in a grid within a view area of a user interface as described below in relation to FIG. 3A.

In addition, user interface provider 102 may cause a computing device to display one or more graphical objects that enable navigation and browsing of content items within a view area of the user interface. In one or more example embodiments, user interface provider 102 can cause a computing device to present a scroll element with which a user can interact. In particular, a user can interact with the scroll element to move or scroll through the gallery of content items presented in the view area. The scroll element can have various features and characteristics, which will be described in further detail below. User interface provider 102 can also provide, in addition to, or as part of, the scroll element, additional graphical objects that enable various other navigational and browsing features of navigation system 100.

User interface provider 102 may cause a computing device to present one or more other graphical objects that facilitate a variety of other functions (e.g., in addition to navigating and browsing of content items). For example, in addition to presenting content items and navigation/browsing graphical objects, user interface provider 102 can further configure the user interface to include graphical objects that allow a user to share content items with one or more other users, allow a user to send a message to one or more users, as well as various other actions described more fully below. Moreover, user interface provider 102 can also configure a user interface to include informational graphical objects that provide helpful information to a user about content navigation system 100, content items, or one or more other users.

As further illustrated by FIG. 1, navigation system 100 can include user input detector 104. In one or more embodiments, user input detector 104 can detect, receive, and/or facilitate detecting a user interaction and providing user input based on the user interaction. In some examples, user input detector 104 may be configured to detect one or more user interactions. As referred to herein, a "user interaction" means a single interaction, or combination of interactions, received from a user by way of one or more input devices.

For example, user input detector 104 may be configured to detect a user interaction from a keyboard, mouse, touch screen, or any other input device. In the event a touch screen is utilized, user input detector 104 may be configured to detect one or more touch gestures that form a user interaction (e.g., swipe gestures, tap gestures, pinch gestures, or reverse pinch gestures) provided by a user by way of the touch screen. In one or more embodiments, the detected touch gestures may be provided in relation to and/or directed at one or more graphical objects, items or elements of a user interface presented on the touch screen. User input detector 104 may be additionally, or alternatively, configured to receive data representative of a user interaction. For example, user input detector 104 may receive one or more user configurable parameters from a user, one or more user commands from the user, and/or any other suitable user input.

Navigation system 100 can use input and other data received from user input detector 104 to manage, control, and/or facilitate the use of a user interface. For example, in response to one or more touch gestures detected by user input detector 104, navigation system 100 may allow a user to access a collection of content items. In addition, in response to user input detector 104 detecting one or more touch gestures, navigation system 100 may allow a user to navigate through the collection of content items. Additionally or alternatively, user input detector 104 can detect one or more user interactions that can cause the navigation system 100 to allow a user to browse content items. More specifically, in response to one or more touch gestures detected by user input detector 104, navigation system 100 may allow a user to view, search, edit, share, and/or otherwise experience a collection of content items within a user-friendly and intuitive user interface.

In addition, FIG. 1 illustrates that navigation system 100 can include scroll element controller 106. In one or more embodiments of the present invention, scroll element controller 106 controls the manner in which a scroll element controls navigation and browsing through a collection of content items within a view area. For example, based on user input detector 104 detecting a user interaction relative to a scroll element, scroll element controller 106 controls the way in which a user can navigate, browse and/or otherwise move content items in and out of a view area of a user interface.

In one or more embodiments, scroll element controller 106 can control the rate at which navigation through a collection of content items occurs. For example, scroll element controller 106 can facilitate scaled scrolling through content items. As an example, in one or more embodiments, scroll element controller 106 can amplify a user interaction with a scroll element into a navigational movement through content items. In other words, for a unit of measurement of a user interaction (e.g., a swipe gesture), scroll element controller 106 moves a gallery of a content items a distance greater than the unit of distance of the user interaction. Alternatively, the scroll element controller can facilitate dampened scrolling (e.g., for a unit if distance of a user interaction, scroll element controller 106 moves a grid of content items a distance less than the unit of distance of the user interaction).

Scroll element controller 106 can facilitate scaled scrolling using a variety of techniques. In one or more embodiments of the invention, user interface provider 102 provides a horizontal scroll element and a vertical grid of content items. Within such a user interface configuration, scroll element controller can translate a horizontal user interaction (e.g., a side-to-side touch gesture) into a vertical movement of the grid within a view area. In such an embodiment, the scroll element controller can map vertical pixels on the grid of content items to horizontal pixels on the scroll element. For example, the scroll element controller can map one hundred vertical pixels on the vertical grid to one horizontal pixel on the horizontal scroll element. Thus, when user input detector 104 detects a horizontal gesture with respect to the scroll element, scroll element controller 106 amplifies the gesture into movement of the vertical grid through the view area at a control ratio of 1:100.

The ratio at which the horizontal pixels of the scroll element are mapped to the vertical pixels of the grid is referred to herein as a control ratio, and can vary from one embodiment to the next. For example, the control ratio may range between about 1:500 to 1:1. More specifically, the control ratio may range between about 1:250 to 1:150. And even more specifically, the control ratio may be about 1:200. Of course, in one or more embodiments the control ratio may be higher than 1:500. Furthermore, the control ratio may dampen a user interaction. For example, the control ratio may be 10:1 (e.g., for every 10 pixels of horizontal user interaction, the vertical grid moves 1 vertical pixel).

The manner in which scroll element controller 106 translates a user interaction with the scroll element into a navigational or browsing movement of content items can also vary from one embodiment to the next. As explained above, scroll element controller 106 can translate a horizontal user interaction into a vertical movement. Alternatively, scroll element controller 106 can translate a horizontal user interaction into a horizontal movement, a vertical user interaction into a horizontal movement, or a vertical user interaction into a vertical movement. In no way is scroll element controller 106 limited to only vertical and horizontal embodiments, and in one or more alternative embodiments scroll element controller 106 can translate any direction of a user interaction into the same direction, or any other direction, of navigational movement of content items.

Pixels are only one example of a unit of measurement that scroll element controller 106 can use to control the function of the scroll element. Other units of measurement include, but are not limited to, measured screen distance, interaction time duration, and/or any other unit of measurement that user input detector 104 can determine based on a user interaction.

Scroll element controller 106 can use one or more other factors to control the manner in which the scroll element can be used to navigate through a collection and/or browse a collection of content items. In one or more embodiments, the collection size (e.g., the number of content items in a collection) can, at least in part, determine the control ratio. For example, the larger the collection size, the larger the control ratio, while the smaller the collection size, the smaller the control ratio. In this way, scroll element controller 106 can control navigation through collections of different size while maintaining a degree of user experience consistency. In one or more embodiments, the collection size directly affects the size of a gallery (i.e., the number of pixels in a gallery), and therefore, the content ratio can also be based on the size of a gallery that contains a collection of content items.

For instance, by using collection size as a factor, scroll element controller 106 can provide a scroll element that roughly takes the same amount of manual time to navigate through a large collection as it does a small collection. For example, scroll element controller 106 can determine a control ratio that allows a user to navigate through a collection of 80,000 content items in the same amount of time it takes a user to navigate through a collection of 1,000 content items. In particular, scroll element controller 106 can set the control ratio for the 80,000 content item collection at a high ratio so that the scroll rate through the content items is high. In contrast, scroll element controller 106 can set the control ratio for the 1,000 content collection at a lower ratio so that the scroll rate through the content items is lower. Due to the differing scroll rates based on the different collection sizes, the amount of manual time it takes to navigate through both the large collection and the small collection can feel substantially the same to the user. Thus, scroll element controller 106 can provide a consistent user experience regardless of the size of a particular collection.

Along similar lines, scroll element controller 106 can actively adjust the control ratio based on the size of a collection. For instance, scroll element controller 106 can automatically adjust the control ratio when a user deletes content items from a collection, or when a user adds content items from a collection. In other words, the control ratio can be a variable based on the size of a collection, and thus the scroll rate can be based on the size of the collection. In one or more embodiments, the control ratio can adjust in a step-wise fashion. For example, the control ratio can be set at a first value up until a particular collection size threshold his met, after which the control ratio can change to a second value. Due to the variable control ratio, a user can continue to build a collection of content items, while navigation system 100 continues to provide a consistent and quality user experience.

In addition to collection size, scroll element controller 106 can use other factors to determine the control ratio. For example, the type of computing device and/or computing device characteristics (e.g., screen size, processor speed, memory size) can be used to determine a control ratio. In addition, the type of content items in the collection can factor into the determination of the control ratio.

As mentioned above, and as illustrated in FIG. 1, navigation system 100 may further include communication manager 108. Communication manager 108 can facilitate receiving and sending data to and from navigation system 100. In particular, communication manager 108 can facilitate sending and receiving content items. For example, communication manager 108 can package or format content items to be sent or received from navigation system 100 in any necessary form that is able to be sent through one or more communication channels and using an appropriate communication protocol, as described further below with reference to FIG. 13.

As discussed above, the navigation system 100 can include storage system 110, as illustrated in FIG. 1. Storage system 110 may maintain content item data 112 representative of data associated with content items. For example, content data 112 can include content item files, metadata associated with content items, reduced-sized files, and other similar type data that navigation system 100 may use in connection with presenting a collection of content items by way of a user interface. In particular, content data 112 can include information that allows navigation system 100 to organize content items, as will be explained in more detail below with reference to FIGS. 8A-8D.

Storage system 110 may also maintain configuration data 114 representative of information used to configure one or more features, functions and/or elements of navigation system 100. For example, configuration data 114 may include control ratios, control ratio formulas, user settings/preferences, user account information, and other similar types of configuration data.

As will be described in more detail below, each of the components 102-110 can be used alone and/or in combination with the other components of navigation system 100 to provide user interface used to navigate and browse a collection of content items. In particular, FIGS. 3-9 and the description that follows illustrate various example embodiments of the general principles of navigation system 100 described above.

Figure 2:
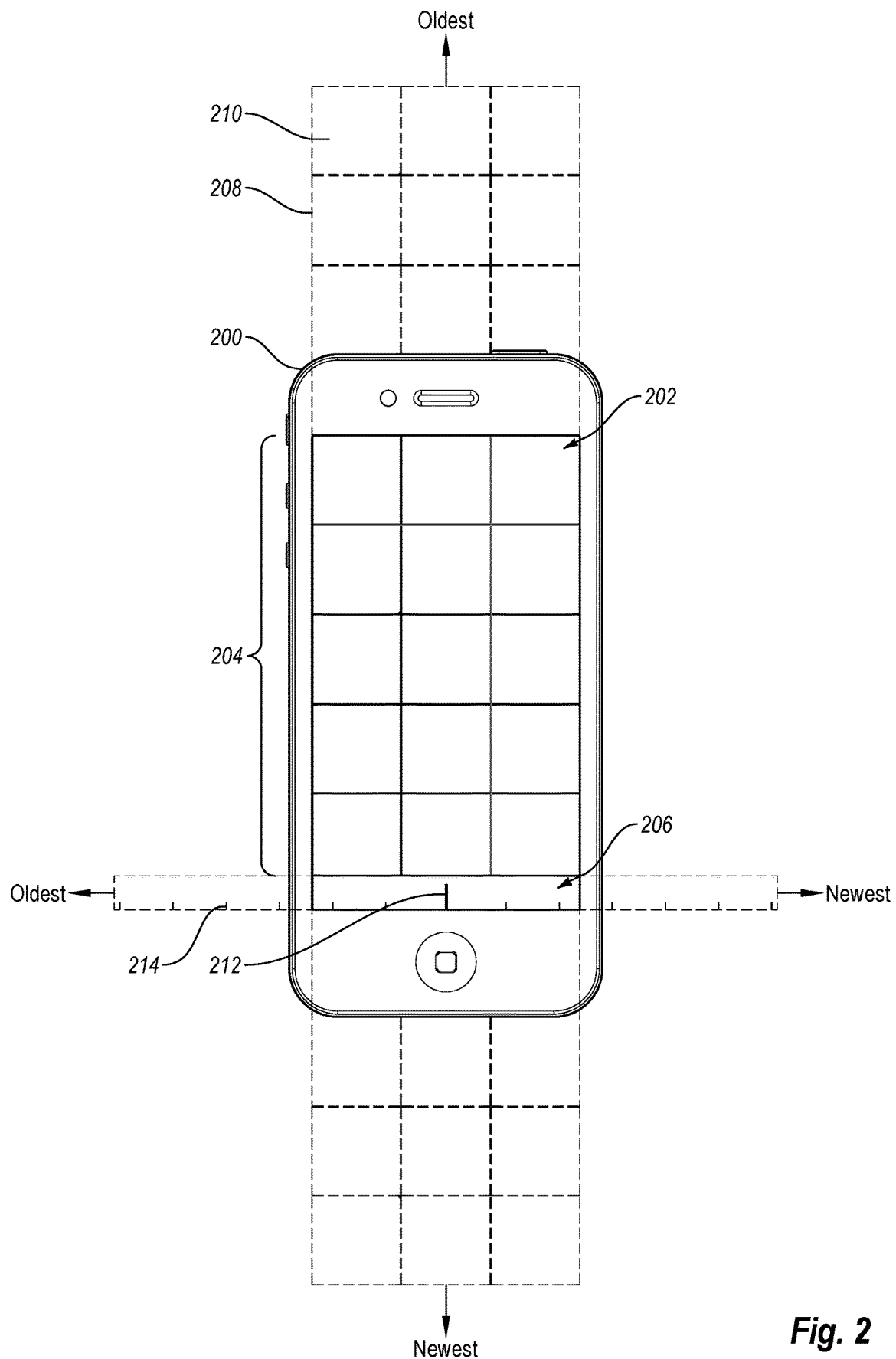
FIG. 2 illustrates a concept diagram in accordance with one or more embodiments.

As mentioned above, navigation system 100 may be implemented partially or entirely on a computing device (e.g., computing device). For example, FIG. 2 illustrates computing device 200 that may implement one or more of components 102-114. As illustrated in FIG. 2, computing device 200 is a handheld device, such as a mobile phone device (e.g., a smartphone). As used herein, the term "handheld device" refers to device sized and configured to be held/operated in a single hand of a user. In additional or alternative examples, however, system 100 may be implemented by any other suitable computing device, such as, but not limited to, a tablet device, a handheld device, a laptop or desktop computer, a personal-digital assistant device, and/or any other suitable computing device configured to perform one or more of the processes and/or operations described herein.

As illustrated in FIG. 2, computing device 200 may include and/or be associated with touch screen 202 by way of which a user interface may be presented and/or by way of which user interaction may be received and/or detected. Additionally or alternatively, computing device 200 may include any other suitable input device (e.g., a keypad, one or more input buttons). As illustrated in FIG. 2, touch screen 202 can present a user interface that includes view area 204 and scroll element 206. In general, view area 204 is the portion of the user interface that facilitates the presentation of a collection of content items electronic communications sent by a user of computing device 200 and/or received from one or more users.

As illustrated in FIG. 2, view area 204 can be used to present a collection of content items using a grid 208. For example, user interface provider 102 can arrange grid 208 into a vertical configuration. Grid 208 can include a plurality of grid units 210, each of which is configured to include or display a content item. Thus, the number of content items included within the collection determines the total size of gird 208 (e.g., the vertical size or dimension). As shown further shown in FIG. 2, grid 208 can have a width of three grid units 210. In one or more alternative embodiments, the number of grid units 210 included in the width of the collection grid can vary between about 1 and about 6 or more, depending on the type of content item, user preferences, or other factors.

In addition, a screen dimension and geometric shape of grid unit 210 can vary from one embodiment to the next. As shown in FIG. 2, grid unit 210 can have a substantially square geometric shape. In one or more embodiments, grid unit 210 can have a substantially rectangular shape, or other geometric shape. In addition, the width and height of grid unit 210 can vary depending on the type of content item, user preferences, device capabilities, or other factors. Furthermore, in one or more embodiments the size of the grid units 210 can vary. In other words, rather than having a uniform size, the grid units 210 can vary based on the content items or to otherwise increase the aesthetics of the user interface.

As further illustrated in FIG. 2, user interface provider 102 can configure grid 208 to represent a timeline of content items. For example, in the event that the content items are digital photos, user interface provider 102 can position the oldest digital photos near the top of grid 208, and position the newest digital photos near the bottom of the grid 208. Thus, as a user can navigate though content items by moving grid 208 vertically through view area 204, as indicated by the vertical arrows shown in FIG. 2. In one embodiment, the user can interact with view area 204 of the using vertical swipe gestures to browse the content items within grid 208.

Due to the fact that grid 208 can become very large, user interface provider 102 can provide scroll element 206 to allow scaled scrolling of the collection grid. As illustrated in FIG. 2, scroll element 206 can represent the size of grid 208. For example, the left end of scroll element 206 can correspond with the top of grid 208. Similarly, the right end of scroll element 206 can correspond with the bottom of grid 208. Moreover, the area between the left end and the right end of scroll element 206 corresponds to an associated area between the top and bottom of grid 208 (e.g., although as explained above, the area of the scroll element and the area of the gallery do not have to correspond at a 1:1 ratio). Therefore, as a user interacts with scroll element 206, grid 208 moves within view area 204 in response.

In one or more embodiments, if the size of grid 208 is below a threshold, scroll element 206 is not active. For example, if the size of the grid 208 does not necessitate scroll element 206 to navigate grid 208, user interface provider 102 will not provide scroll element on the user interface. In one example, embodiment, the threshold can be about fifty content items. In one or more alternative embodiments, the threshold can be more or less than about fifty content items.

FIG. 2 illustrates that user interface provider 102 can position scroll element 206 toward or directly at the bottom of touch screen 202. In addition, user interface provider 102 can orient scroll element 206 in a horizontal orientation. The position and orientation of scroll element 206 shown in FIG. 2 call allow a user to easily navigate through grid 208 using only the user's thumb on the hand holding computing device 200. In particular, due to the position and orientation of scroll element 206, a typical user's thumb can easily interact with all portions of scroll element 206, thus providing a user-friendly interface. In alternative embodiments, the position and the orientation of scroll element 206 can vary. For example, a user may rotate computing device 200 ninety degrees. When rotated, a vertical scroll element located on the right side of touch screen 202 may provide a user-friendlier interface.

Scroll element 206 can include indicator 212 that indicates the location within scroll element 206 that corresponds to the portion of grid 208 that is currently being presented in view area 204. In addition, scroll element 206 can further include markers 214 to indicate other portions of grid 208 to which the user can navigate using scroll element 206 by lining up markers 214 with indicator 212. Additional features and characteristics of grid 208 and scroll element 206 will be explained in greater detail below.

Figure 3A:
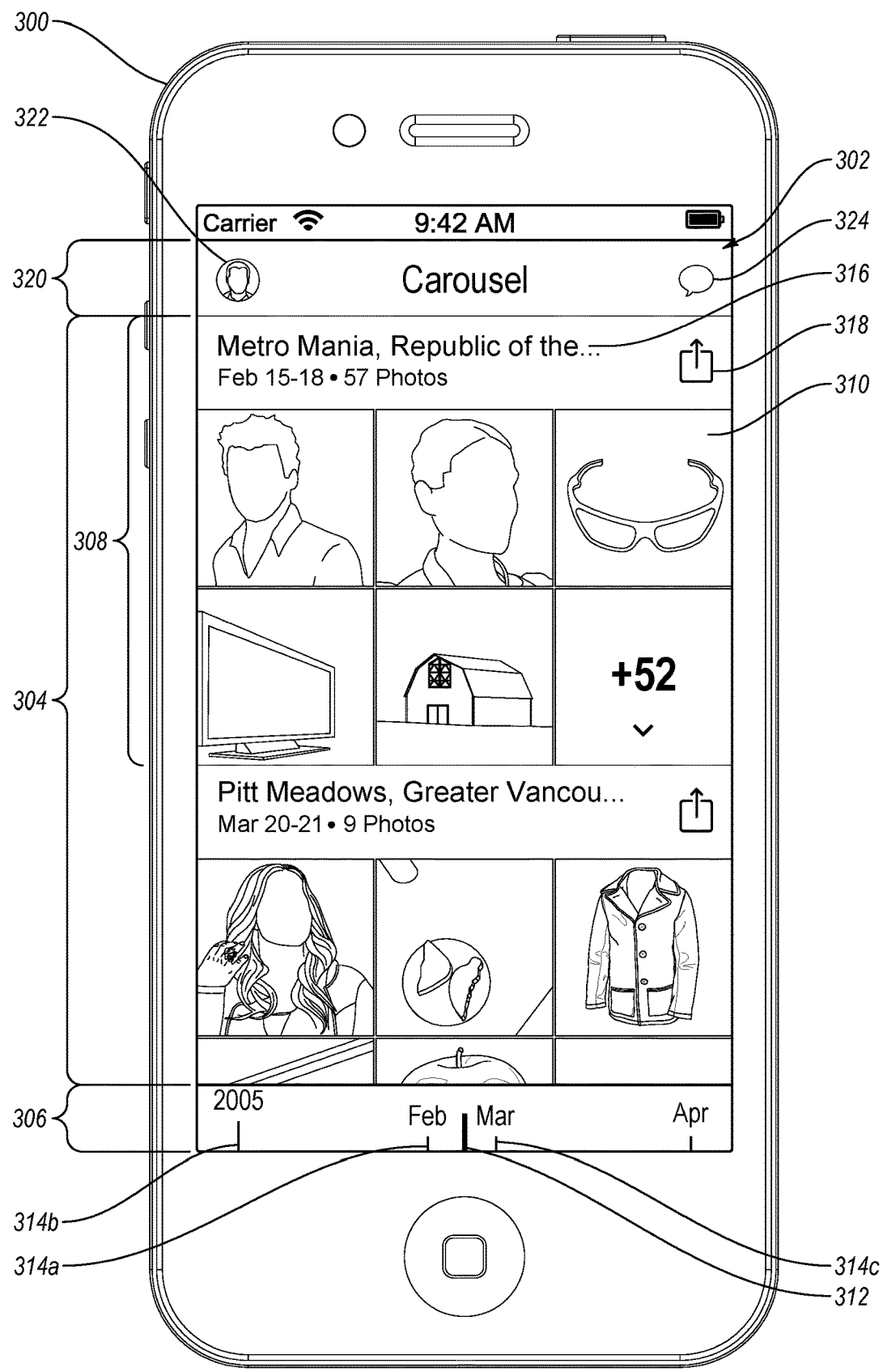
FIGS. 3A-3B illustrate a graphical user interface for a content navigation system in accordance with one or more embodiments.

FIG. 3A illustrates an example of a user interface provided by navigation system 100. For example, FIG. 3A shows computing device 300 with touch screen 302. As described above, the user interface can include view area 304 and scroll element 306. FIG. 3A shows additional example features of scroll element 306. For example, scroll element 306 can include indicator 312. As illustrated, indicator 312 can appear to be bold in comparison to markers 314a and 314b to set indicator 312 apart from other markers. In one or more embodiments, indicator 312 can be a different color, texture, or opacity compared to other markers on scroll element 306.

As further illustrated in FIG. 3A, scroll element 306 can include markers 314a, 314b that indicate dates or approximate dates that correspond to dates associated with content items within the collection of content items. For example, digital photos can be associated with a date the digital photo was taken (e.g., metadata included with a digital photo can include the date the photo was taken). Thus, markers 314a and 314b, along with additional markers within scroll element 306, form a timeline on scroll element 306. A user can interact with scroll element 306 to navigate within the collection of content items to locate content items associated with the date next to markers.

As discussed above, scroll element controller 106 can determine a control ratio that translates a user's interaction with scroll element 306 into movement of content items within view area 304. For instance, the number of content items located within a time frame between indicator 312 and marker 314b can include, perhaps, hundreds or thousands of content items. In order to navigate quickly through a large number of content items, a user can simply provide a swipe gesture over scroll element 306 for a distance that is substantially equal to actual screen distance between indicator 312 and marker 314b. In response to the user's interaction, scroll element controller 106 can cause user interface provider 102 to quickly scroll past the hundreds of content items, and display the content items associated with the date of marker 314b in view area 304.

Markers included within scroll element 306 can have various aesthetic features that can represent information. For example, FIG. 3A illustrates that marker 314a is shorter compared to marker 314b. In this circumstance, the shorter marker 314a can indicate a month, while the longer marker 314b can indicate a year. Various other aesthetic differences and features can indicate different types of markers. For example, scroll element 306 can include week markers, day markers or other time markers.

Depending on the distance between two adjacent markers, the labels associated with the markers may overlap. For example, if markers 314a and 314c were too close together, the labels "Feb" and "Mar" could overlap and cause confusion. In one or more embodiments, user interface provider 102 can avoid overlapping markers. In one embodiment, user interface provider 102 can determine a distance between two adjacent markers. The user interface provider 102 can then compare the determined distance with a threshold distance. If the determined distance is less than the threshold, user interface provider 102 can hide one of the markers, or hide the label of one of the markers. The threshold distance can be any predetermined distance. In one example embodiment, the threshold distance is 8 dip. In alternative embodiments, however, the threshold distance can be longer or shorter. In one or more embodiments, the threshold distance can be determined by the number of characters in the labels associated with two adjacent markers.

As FIG. 3A further illustrates that view area 304 can include a plurality of content items, for example content item 310. In addition, content items can be arranged within one or more groups depending on characteristics of the content items. The way in which content items are grouped may vary from one embodiment to the next depending on the type of content items or based on user preferences. For example, in one or more embodiments the content items can be grouped based on date, location, size, origin, type, and any other content item characteristic.

For example, FIG. 3A illustrates that group 308 includes fifty-seven digital photos (of which five are displayed in FIG. 3A). Group 308 can be separated from other groups by group information 316 that can include descriptive features of the content items within group 308. In particular, FIG. 3A shows group information 316 includes a location of where the five digital photos within group 308 were taken. In addition, group information 316 can include the date, or in this case, the date range within which a user took the five digital photos. Moreover, group information can include the number of content items within the group.

Upon grouping content items, user interface provider 102 can hide one or more content items within a group from view, or in other words, user interface provider 102 can collapse a group to take up less space within the view area. For example, a group may include fifty-seven content items, as illustrated in FIG. 3A. However, user interface provider 102 can present only group information and the first five content items within the group. Collapsing of groups can allow for a more efficient and faster scrolling through the collection of content items.

As further illustrated in FIG. 3A, a number representing the hidden content items within a group can be displayed proximate the contents items. For example, as illustrated in FIG. 3A, there number indicates that there are fifty-two hidden content items. A user can provide a user interaction with respect to the number to expand the group and cause the user interface provider to unhide, or expand, the content items in a group.

Figure 3B:
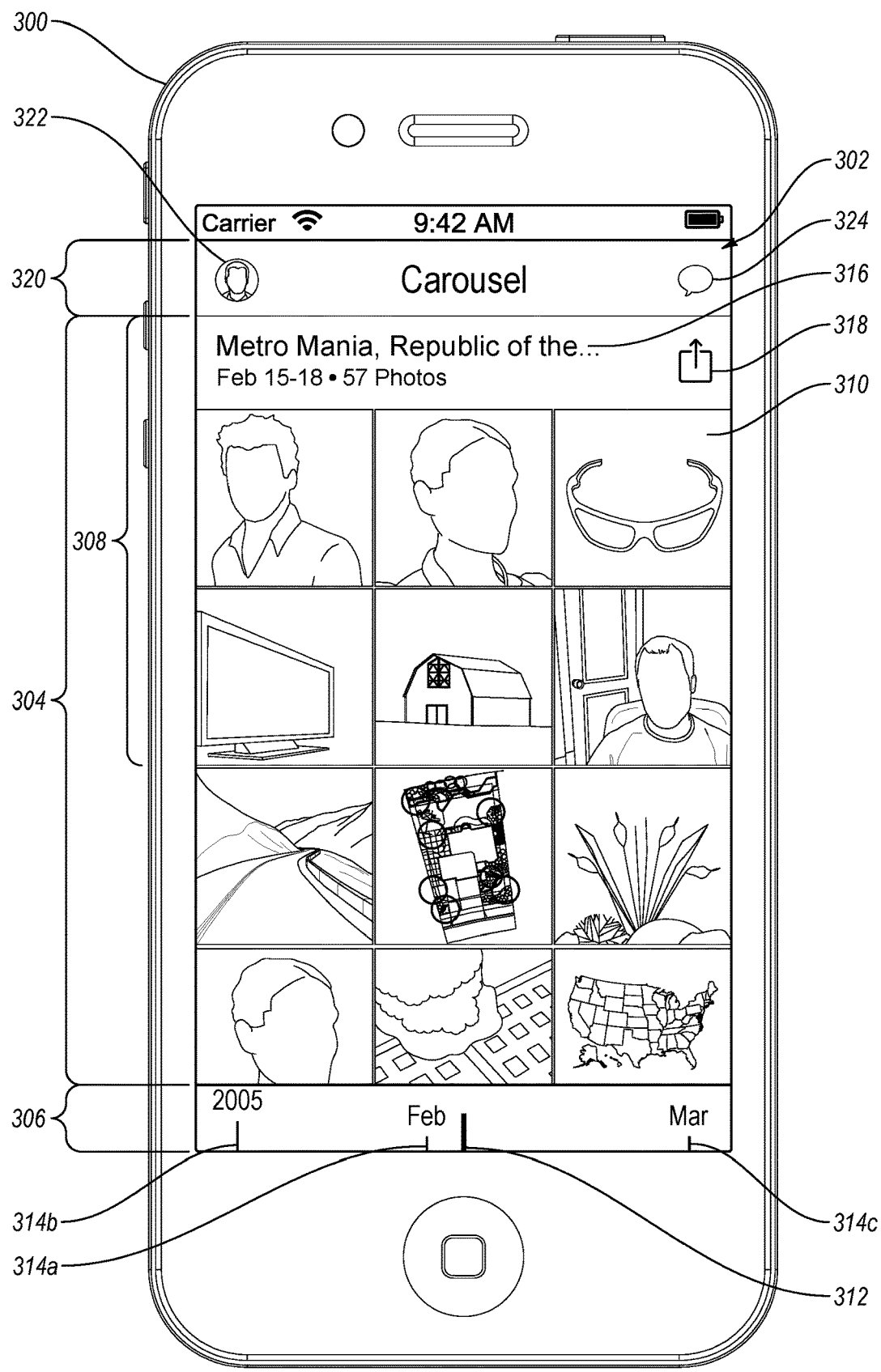

In one example embodiment, upon a user expanding a group, scroll element 306 reconfigures and expands to accommodate the additional content items that are now a visible part of the grid. For example, FIG. 3A illustrates that markers 314a and 314c are close together when the group is collapsed. In contrast, FIG. 3B shows that the group has been expanded, and therefore the distance between markers 314a and 314c has increased to accommodate and account for the increased number of content items that are displayed within the grid due to the group expansion.

FIG. 3A further illustrates that one or more embodiments of the user interface includes share element 318. As illustrated, share element 318 can be located next to group information 316. A user can select share element 318 when the user wants to share one or more content items within group 308. For example, user input detector 104 can detect a user interaction (e.g., the user tapping on a portion of touch screen 302) relative to share element 318. Upon a user selecting share element 318, communication manager can share the content items in the group. In one embodiment, selecting the share menu brings up an addition menu that allows the user to select which content items within the group to share, as well as select with which users to share the content items.

Additionally, FIG. 3A illustrates that one or more embodiments of navigation system 100 can provide a user interface that includes header 320. Header 320 can include user identifier 322 that indicates an identity of a user. For example, user identifier 322 can indicate the identity of the user of computing device 200. Alternatively, the user identifier 322 can indicate the identity of another user that shares access to the collection of content items. If more than one user has access to the collection of content items, user interface provider can present multiple user identifiers in header 320.

In addition, header 320 can include message element 324 with which a user can interact to send a message to one or more users. For example, upon a user selecting message element 324, user interface provider can present a messaging interface that allows a user to send a communication to one or more users. In one embodiment, the messaging interface is included as part of navigation system 100. Alternatively, the messaging interface is associated with a third-party messaging service.

Figure 4A:
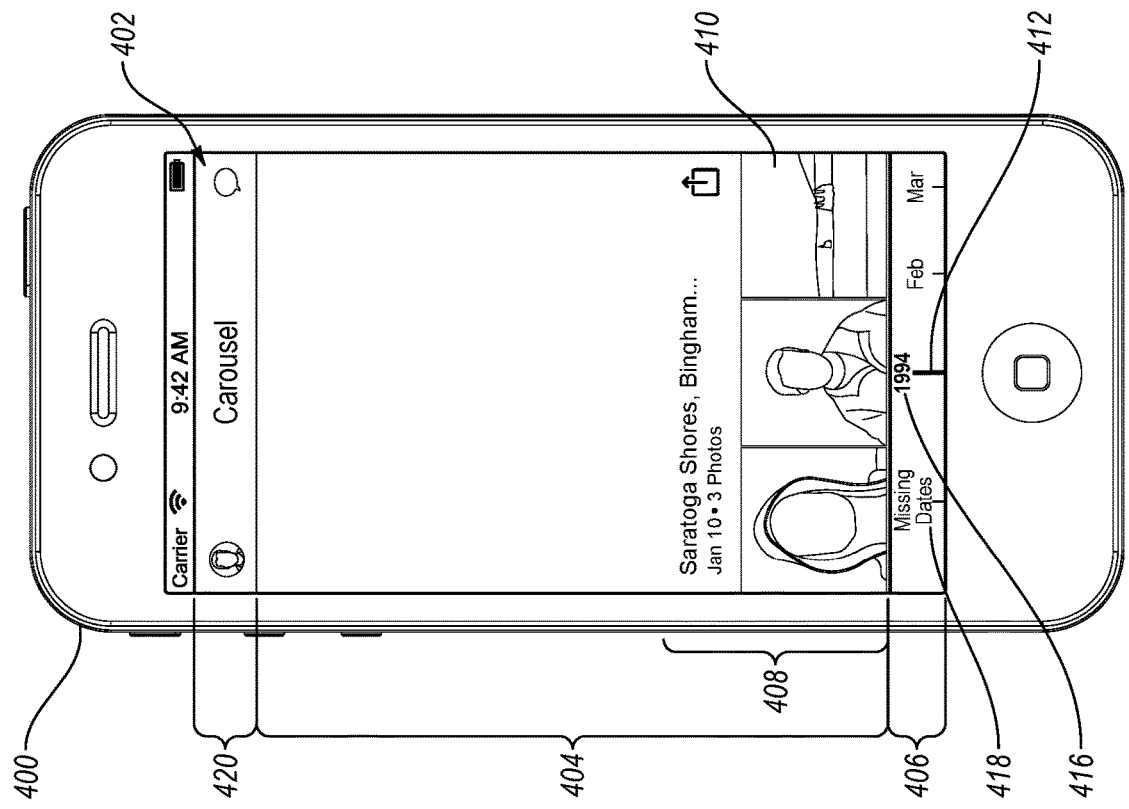
FIGS. 4A-4B illustrate a graphical user interface for a content navigation system having a scroll element in accordance with one or more embodiments.
Figure 4B:
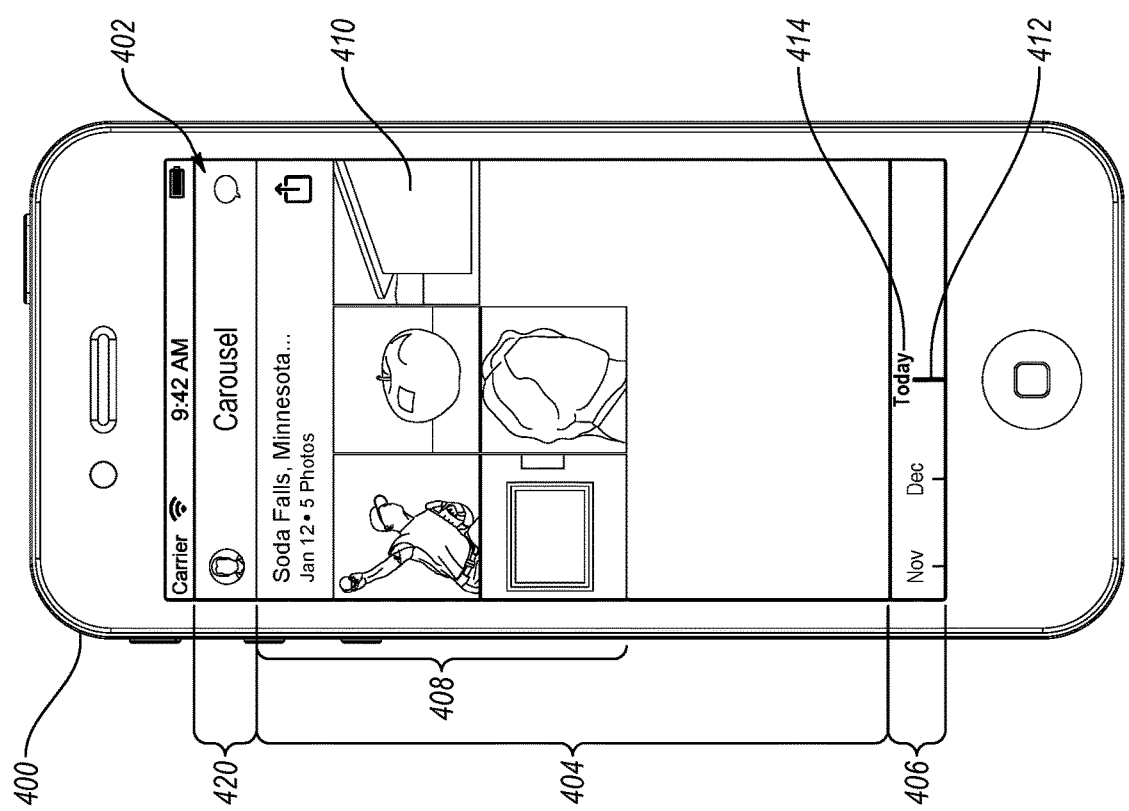

FIGS. 4A-4B illustrates one or more additional features that can be included within navigation system 100. In particular, FIGS. 4A-4B illustrate one example embodiment of how scroll element 406 functions upon reaching the one or the other end of the scroll element. Similar to what has been described previously with respect to FIG. 3A, FIGS. 4A-4B illustrate computing device 400 that includes touch screen 402 presenting a user interface having view area 404, scroll element 406, group 408 of one or more content items 410, and header 420.

FIG. 4A shows that scroll element 406 has reached the right end of scroll element 406. In one example embodiment, because the right end of scroll element 406 can represent the newest content item (e.g., see FIG. 2), user interface provider 102 can associate the word "Today" with marker 414 corresponding to the right end of scroll element 406. For instance, as applied to marker 414, the label "Today" can trump the date that would have otherwise been associated with the marker. In particular, user interface provider 102 can associate the label "Today" to marker 414 based on determining that the marker 414 is the last marker on the right end of scroll element.

Alternatively, user interface provider 102 can associate a date that is associated with the content items corresponding to marker 414. In one or more embodiments, user interface provider 102 can determine if the date associated with the content items corresponding to marker 414 exceeds a time period threshold compared to the current date. For example, if the date associated with marker 414 is more than two weeks in the past from the current date, user interface provider 102 can label marker 414 with the date associated with the content items corresponding to marker 414. If, however, the date is less than two weeks in the past from the current date, user interface provider 102 can cause the "Today" label to trump the date.

The time period threshold can be any amount of time greater or less than two weeks. Alternatively, or in addition to the timer period threshold, user interface provider 102 can determine if the date associated with the content items at the end of the collection is within the current month. If the date is within the current month, the "Today" label trumps the date associated with the content items; however, if the date is outside the current month, user interface provider 102 can label the marker 414 with the date associated with the content items.

Along similar lines as described above with respect to the right end of scroll element 406, the left end of scroll element 406 can also use one or more factors to determine how to label a mark associated with the left end of scroll element 406. For example, FIG. 4B illustrates that upon reaching the left end of scroll element 406, the user interface provider 102 can label the last marker 416 with the year associated with the content items corresponding to marker 416. As with the "Today" label above, user interface provider 102 can recognize that marker 416 is located on the left end of scroll element 406, and therefore, provide the year instead of the month. Alternatively, user interface provider 102 can provide the month, or the month and year. In yet a further embodiment, the user interface provider 102 can provide a label, such as, "Start-Year," to further visually indicate that the marker 416 is the start of the timeline.

As further illustrated in FIG. 4B, user interface provider can present a marker 418 associated with content items that are not associated with, or that do not otherwise include, date information on scroll element 406. For example, a collection of digital photos may include one or more photos that do not have date information included in the digital photo metadata. As illustrated in FIG. 4B, user interface provider 102 can position the content items that do not include date information on one end of the gallery (e.g., prior to the oldest content items), and therefore, user interface provider can provide marker 418 within scroll element 406 (e.g., prior to the start of the timeline). In one or more other embodiments, the content items that do not include date information can be positioned in other locations within the grid of content items. For example, the content items that do not include date information can be positioned after the newest content items. In addition, user interface provider can simply hide and not provide any content items not associated with date information.

In one or more embodiments, a user can select one or more content items that are missing dates and be prompted to add date information, after which the user supplied date information is associated with the content item. User interface provider 102 can then associate the content items with the corresponding time period within the collection.

Figure 5A:
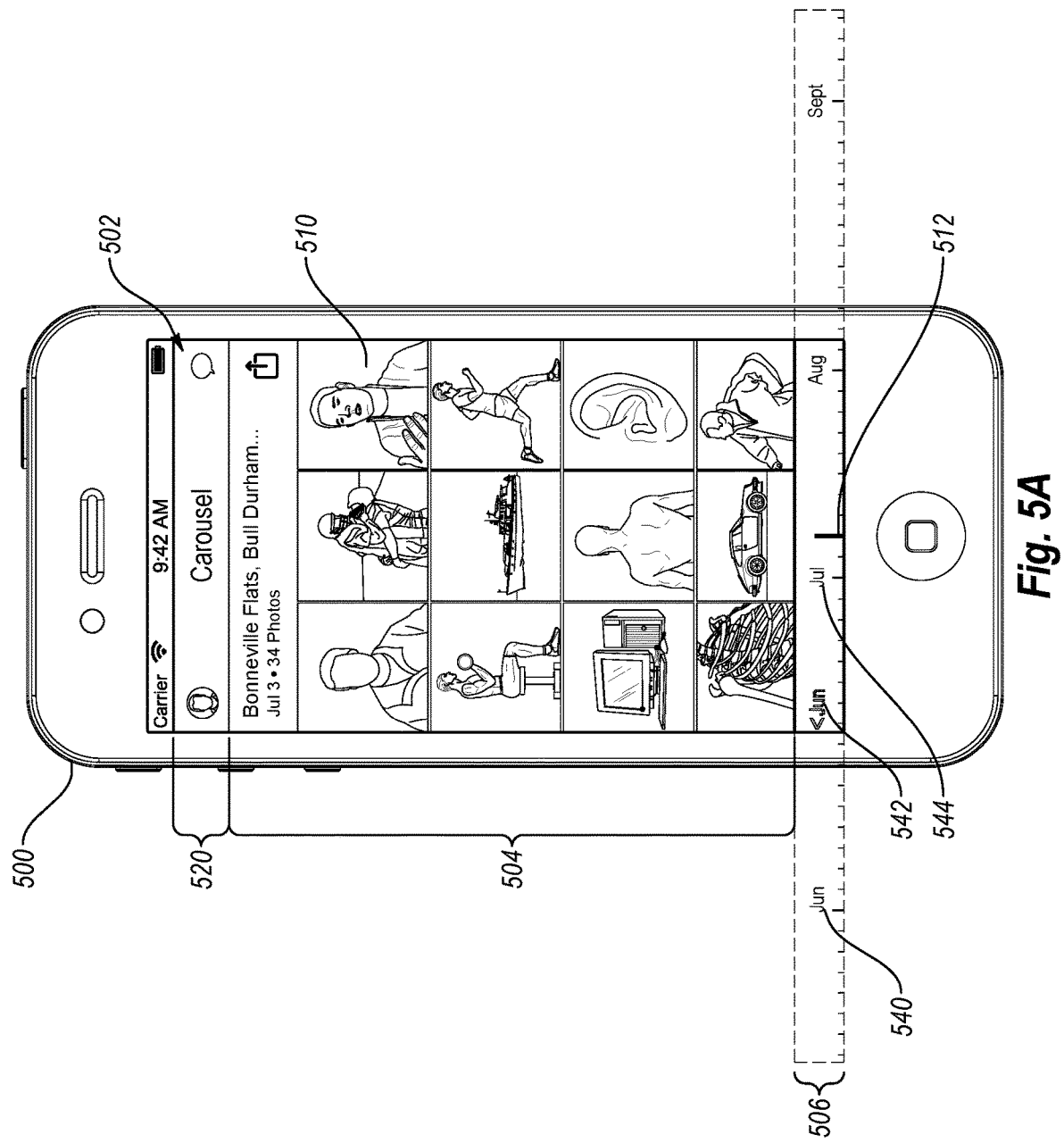
FIGS. 5A-5C illustrate a graphical user interface for a content navigation system having a scroll element in accordance with one or more embodiments.
Figure 5B:
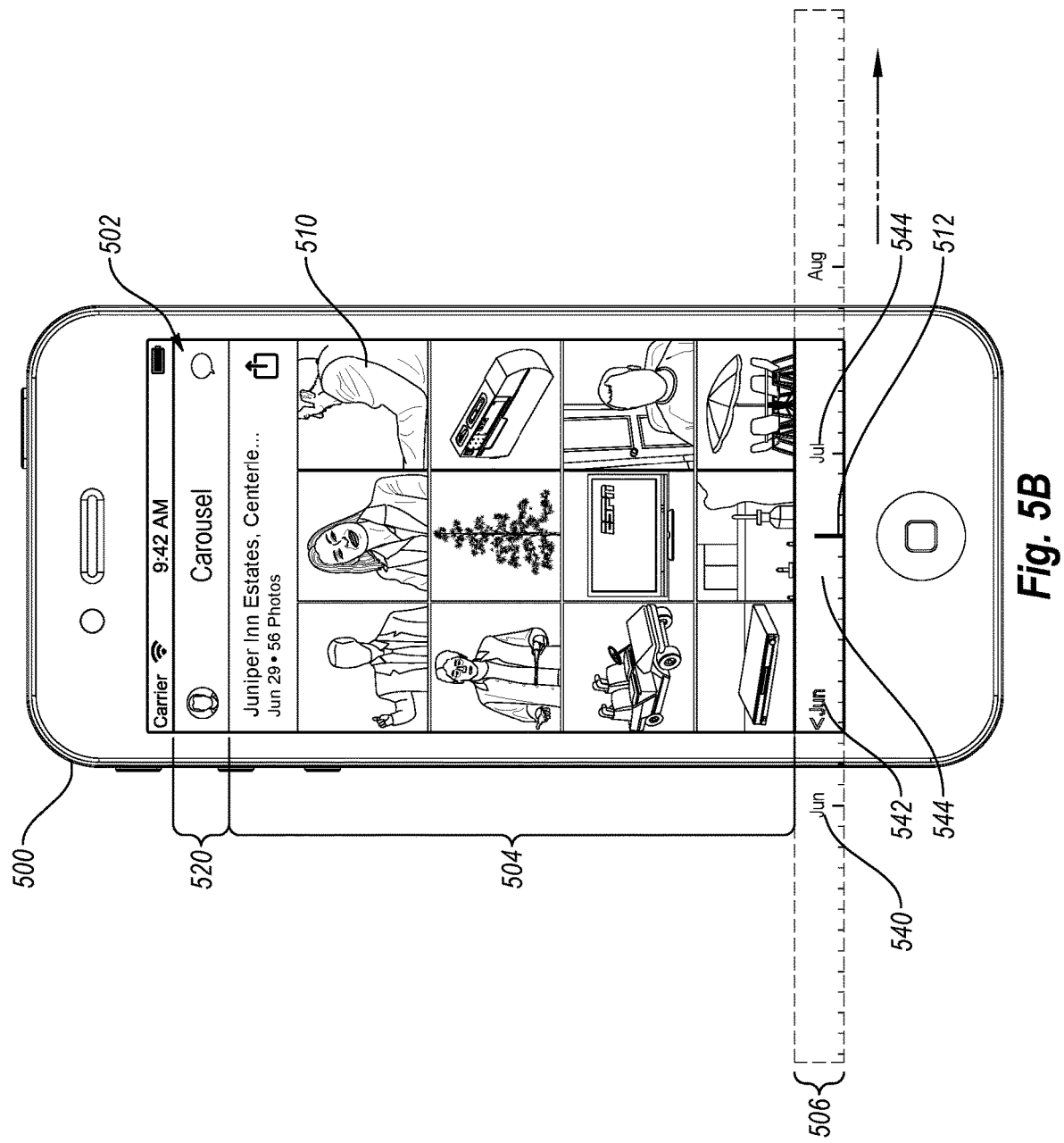
Figure 5C:
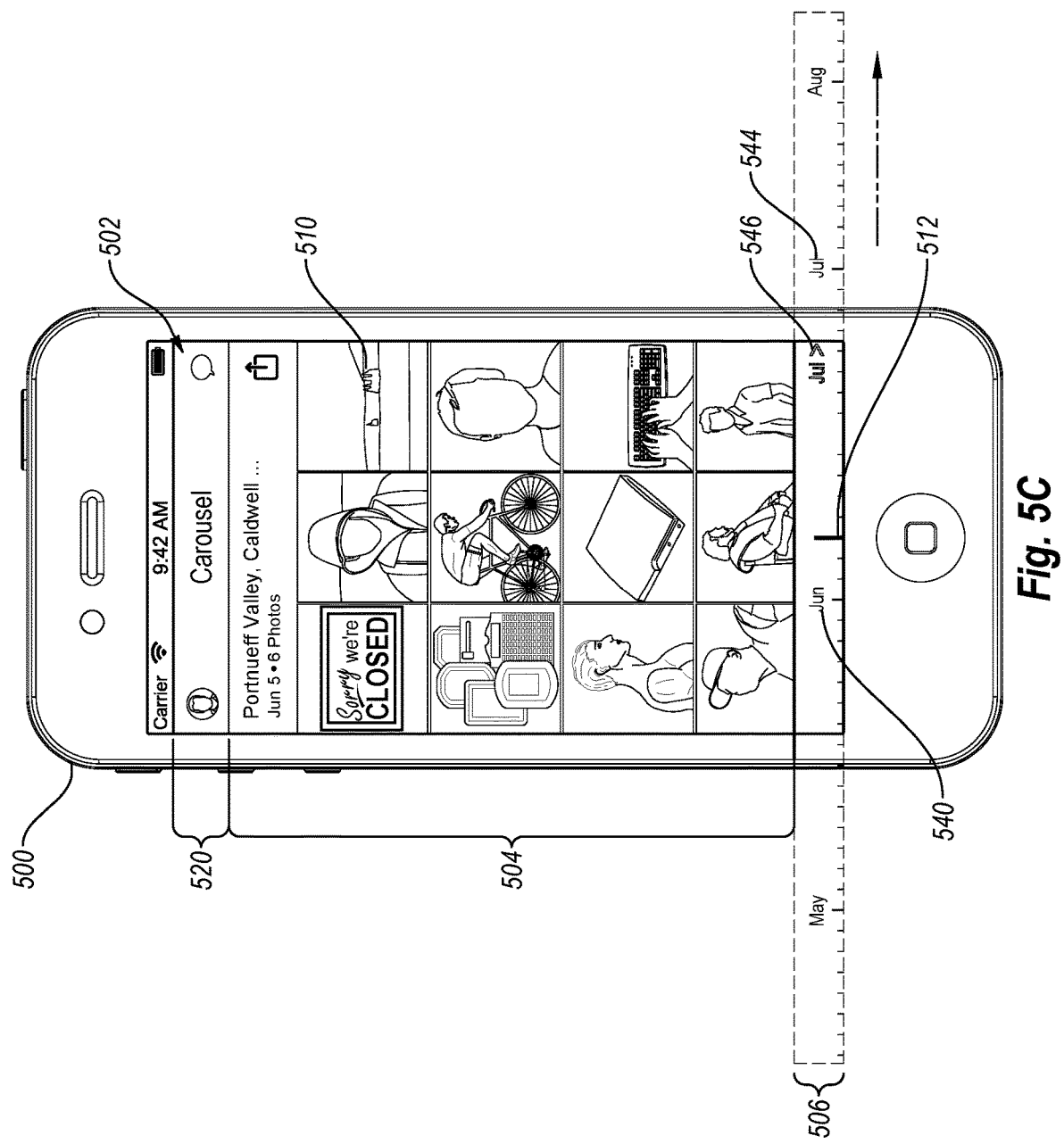

FIGS. 5A-5C illustrate one or more additional features that can be included within navigation system 100. Similar to what has been described previously with respect to FIG. 3A, FIGS. 5A-5C illustrate computing device 500 that includes touch screen 502 presenting a user interface having view area 504, scroll element 506, one or more content items 510, and header 520. In particular, FIGS. 5A-5C illustrate one example embodiment of a floating or sticky marker that can be used within an example scroll element.

For instance, in one or more embodiments, the number of content items within a particular time period can cause there to be a large distance between two markers on scroll element 506. When there is a large distance between two markers, one or both of the markers may no longer be displayed on touch screen 502. For example, FIG. 5A illustrates that the distance between marker 540 and marker 544 is so large that both marker 540 and 544 cannot fit within the width of touchscreen 502. This situation may cause a lack of navigational indicators, leading to potential user confusion.

When such a situation arises, user interface provider 102 can present floating marker 542 to provide a navigation indicator to the user as an indication of what the user will locate if the user continues to scroll in the direction of floating marker 542. For example, user interface provider 102 can determine a maximum distance between two markers that can be displayed simultaneously based on the resolution and size of a display screen. If the distance between two markers is greater than the maximum distance, the user interface provider can cause a floating marker to appear, the floating marker representing actual marker not displayed on the display screen. In one or more embodiments, floating marker 542 can be greyed out, or otherwise configured to appear different than actual marker 540. In addition, floating marker 542 can include additional navigational symbols to allow a user to intuitively control navigation using scroll element 506.

FIG. 5B illustrates that as the user continues to scroll towards marker 540 (as illustrated by the direction arrow), user interface provider 102 can continue to present floating marker 542. As illustrated in both FIGS. 5A and 5B, the user interface provider can be configured to always display at least two markers. In this way, scroll element always can include markers to inform the user of the next section or group of content items scrolling in either direction. In one or more alternative embodiments, user interface provider can be configured to present more or less than 2 markers.

FIG. 5C illustrates that the user has continued to scroll in the direction of control marker 540 (as illustrated by the direction arrow). In particular, FIG. 5C shows that upon marker 540 entering the area of touch screen 502, user interface provider 102 can remove floating marker 542 from the display, and present marker 540. As the scrolling action is occurring with scroll element 506, the function of removing floating marker 542 and presenting marker 540 can be made to appear to the user as if marker 542 simply "stuck" or became "sticky" to scroll element 506 such that it moves in sync with the movement of scroll element 506.

FIG. 5C further illustrates that because user interface provider 102 is presenting marker 540, marker 544 is no longer within the width of touch screen 502 due to the large distance between marker 540 and 544. Thus, user interface provider 102 can present floating indicator 546 that floats above the movement of scroll element 506. As the user continues to scroll in the direction shown in FIG. 5C, marker 540 will eventually approach floating marker 546. Upon marker 540 hitting floating marker 546, user interface provider 102 removes the presentation of floating marker 546.

In addition, FIGS. 5A-5C illustrate that scroll element 506 can further include minor tick marks (e.g., tick marks that are not labeled with a month or year) to provide a visual cue to a user that scroll element 506 is moving or is stopped, depending on the detection of a user interaction. In one or more embodiments, the minor tick marks can be spaced as a function of touch screen 502 width. For example, the minor tick marks can be spaced at a width of about 25% of touch screen 502 width.

Figures 6A, 6B:
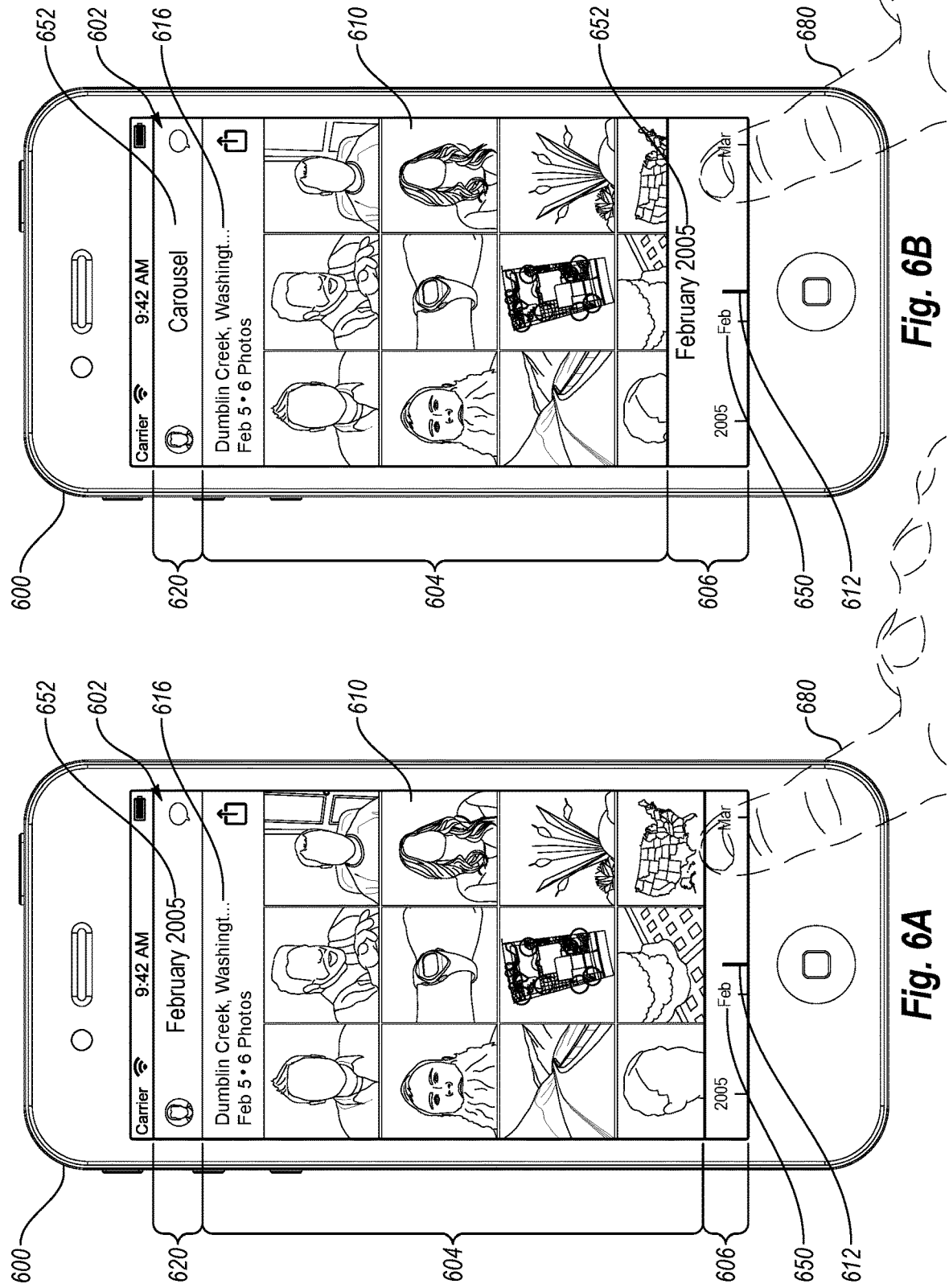
FIGS. 6A-6B illustrate a graphical user interface for a content navigation system having a scroll element in accordance with one or more embodiments.

FIGS. 6A-6B illustrate one or more additional features that can be included within navigation system 100. Similar to what has been described previously with respect to FIG. 3A, FIGS. 6A-6B illustrate computing device 600 that includes touch screen 602 presenting a user interface having view area 604, scroll element 606, one or more content items 610, and header 620. In particular, FIGS. 6A-6B illustrate one example embodiment of a user interface that displays a position indicator.

For example, FIG. 6A shows user finger 670 interacting with scroll element 606. Due to the fact that user finger 670 may block portions of scroll element 606 from view, user interface provider 102 can present position indicator 652. For example, FIG. 6A illustrates that user interface provider 102 can present position indicator 652 within header 620. In one example embodiment, user interface provider 102 only presents position indicator 652 upon user finger 670 interacting with scroll element 606. In this way, header 620 can contain information not associated with a navigation function when the user is not navigating through content items using scroll element 606.

Upon the user interacting with scroll element 606, however, user interface provider 102 can present the position indicator 652 to aid the user in knowing the approximate time period associated with the displayed portion of the collection of content items in view area 604. In particular, FIG. 6A illustrates that position indicator 652 can include the name of marker 650 closest to indicator 612. For example, position indicator 652 reads "February 2005" because marker 650 represents February 2005. In the event the marker is not associated with a timeline, the position indicator 652 can display text and/or symbols that represent the mark closest to indictor 612.

User interface provider 102 can present position indicator 652 in a variety of locations on within the user interface. For instance, FIG. 6B illustrates another example embodiment of position indicator 652. In particular, FIG. 6B illustrates that scroll element 106 can expand to accommodate position indicator 652. As shown, although user finger 670 is interacting with scroll element 606, the user can still view position indicator 652 due to the expanded scroll element 606.

Figure 7A:
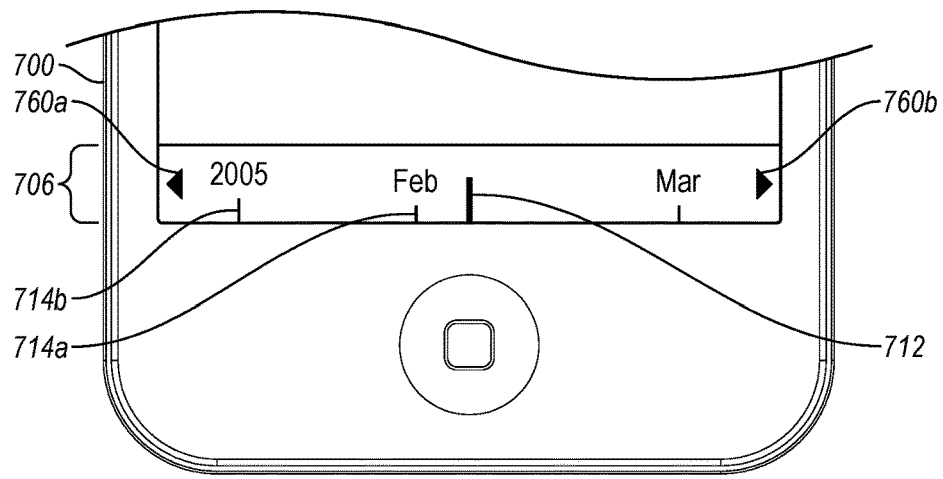
FIGS. 7A-7C illustrate a graphical user interface for a content navigation system having a scroll element in accordance with one or more embodiments.
Figure 7B:
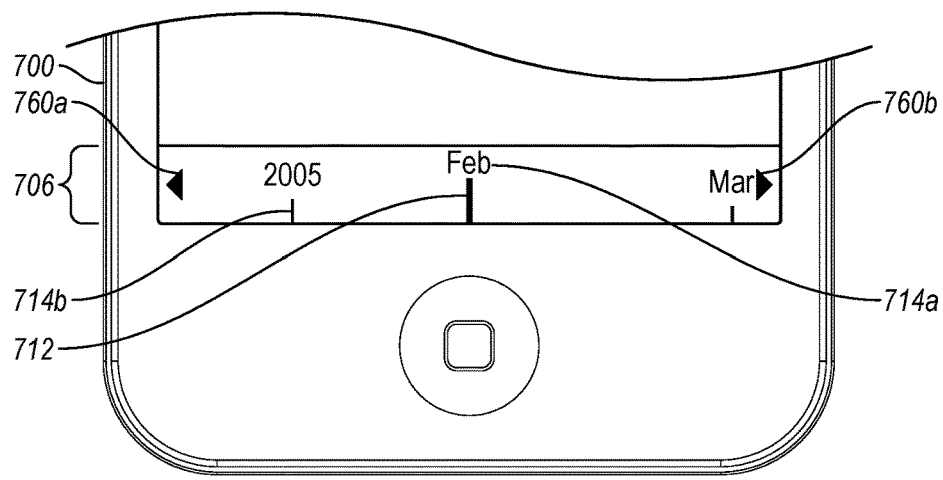
Figure 7C:
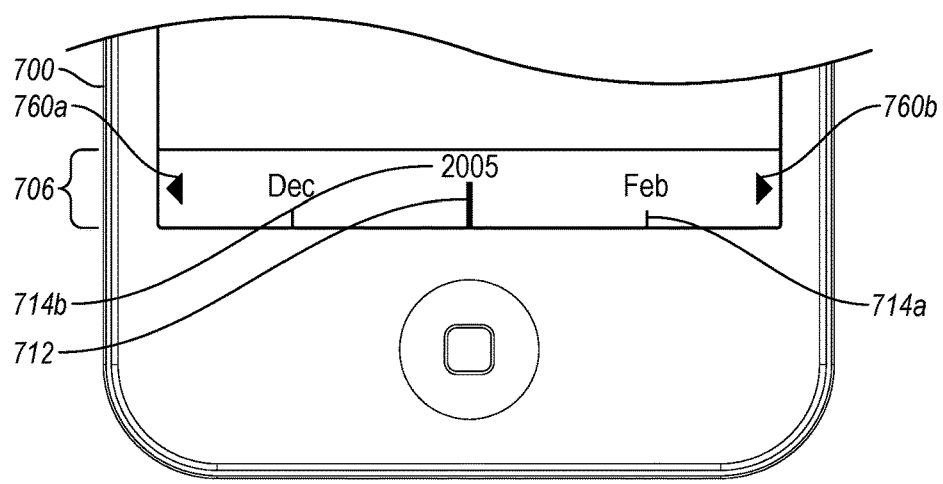

FIGS. 7A-7C illustrate one or more additional features that can be included within navigation system 100. Similar to what has been described previously with respect to FIG. 3A, FIGS. 7A-7C illustrate computing device 700 that includes scroll element 706. In particular, FIGS. 7A-7C illustrate one example embodiment of scroll element 706 that includes quick jump elements.

For example, as illustrated in FIG. 7A, scroll element 706 can include markers 714a, 714b and indicator 712. In addition, scroll element 706 can include quick jump elements 760a and 760b. In one or more embodiments, quick jump elements 760a, 760b can appear as arrows to indicate the direction in which interaction with quick jump elements 760a, 760b cause scroll element 706 to move. In alternative embodiments, quick jump elements 760a, 760b can have different geometric configurations.

The manner in which a user interacts with quick jump elements 760a, 760b can cause scroll element 706 to react in different ways. For example, FIG. 7A illustrates a starting position of scroll element 706. In one embodiment, a user can provide a single tap gesture on quick jump element 760b. In response to the single tap gesture, scroll element 706 can jump to the next month marker. For example, FIG. 7B illustrates that scroll element 706 has moved from the position shown in FIG. 7A to now align marker 714a with indicator 712 after user input detector 104 detected the single tap gesture. Therefore, by providing a series of single tap gestures, a user can jump from one month marker to the next to allow a user to quickly access content items associated with a particular month.

In another example, a user can provide a double tap gesture on quick jump element 760b, starting at the position illustrated in FIG. 7A. In response to the double tap gesture, scroll element 706 can jump to the next year marker. For example, FIG. 7C illustrates that scroll element 706 has moved from the position shown in FIG. 7A to now align maker 714b with indicator 712 after user input detector 104 detected the double tap gesture. Therefore, a user can use quick jump element 760b to jump from one year marker to the next to allow a user to quickly access content items associated with a particular year.

One will recognize that quick jump element 760a can provide the same functionality, but in the opposite scrolling direction as explained with respect to quick jump element 760b. In addition, quick jump elements 760a, 760b can cause other quick jump functions in response to other touch gestures. For example, a user can provide a triple tap gesture to quick jump elements 760a or 760b to can cause scroll element 706 to jump to the right end or left end of scroll element 706, respectively.

As briefly mentioned above, user interface provider 102 can arrange a collection of content items using various characteristics associated with content items. FIGS. 8A-8D illustrate various example embodiments that show how scroll element 806 can be used when content items are arranged or organized based on a characteristic that is different than a date or time.

Figure 8A:
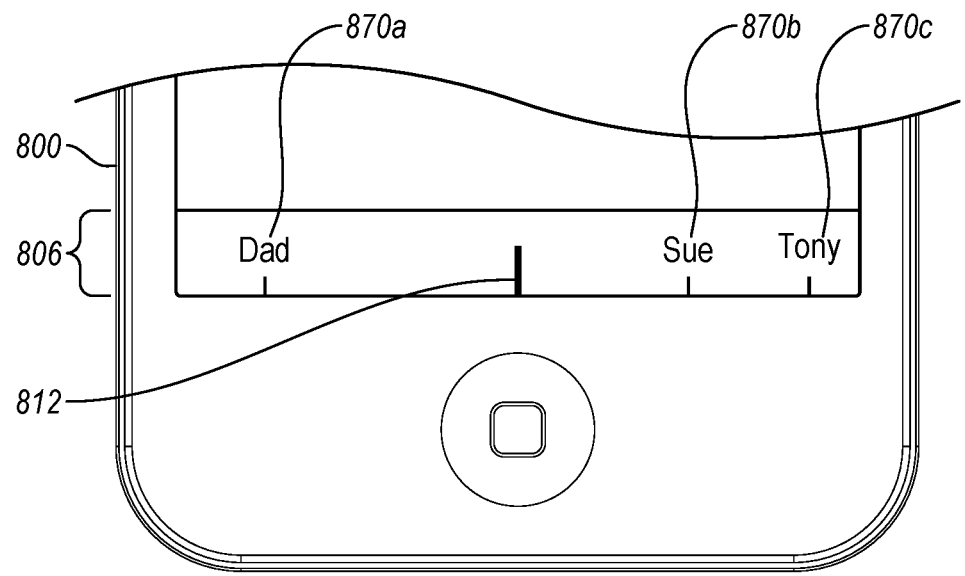
FIG. 8A-8D illustrate a graphical user interface for a content navigation system having a scroll element in accordance with one or more embodiments.

Similar to what has been described previously with respect to FIG. 3A, FIGS. 8A-8D illustrate computing device 800 that includes scroll element 806 having indicator 812. In addition, FIG. 8A illustrates scroll element 806 when an association of a person with a content item determines the arrangement of content items. For example, facial recognition software can recognize people in digital photos and store the names of the people recognized as metadata within the content items. User interface provider 102 can use the metadata to arrange the content items by person. As shown in FIG. 8A, the names 860a, 860b, and 860c can be arranged in alphabetical order to provide easy navigation among the various names. Along similar lines, FIG. 8A could also represent people that have authored a content item (e.g., taken a photo) or other users of an online content management system that are sharing a stream of content items with the user of computing device 800.

Figure 8B:
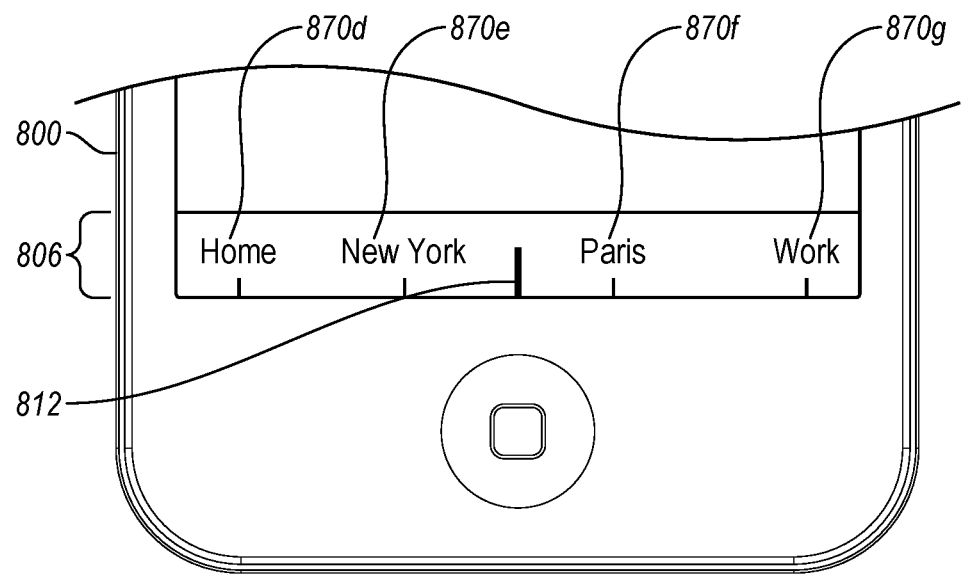

Along similar lines, FIG. 8B illustrates scroll element 806 when an association with a location determines the arrangement of content items. For example, many mobile devices and digital cameras include GPS functionality and insert location information into metadata of a digital photo when it is taken. User interface provider 102 can use the location information to arrange the content items by location, as illustrated by locations 860d, 860e, 860f, and 860g.

Figure 8C:
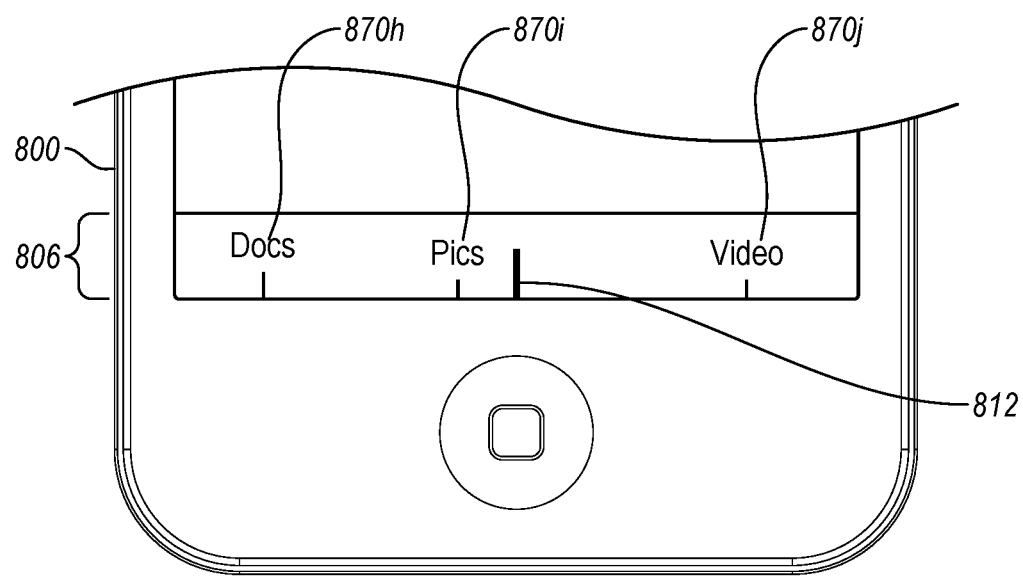

Furthermore, FIG. 8C illustrates scroll element 806 when an association of content item type determines the organization of content items. For example, many users can use the navigation system 100 to navigate through various types of content items. For example, FIG. 8C illustrates that scroll element 806 can allow a user to navigate through content items based on type, as illustrated by 860h, 860i, and 860j.

Figure 8D:
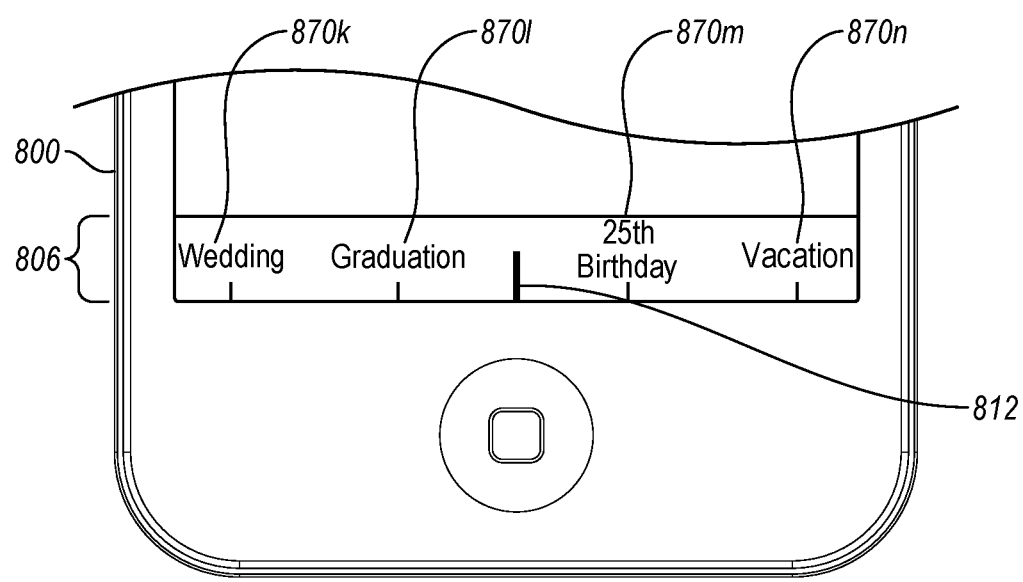

In addition, FIG. 8D illustrates scroll element 806 when an association of a tag determines the arrangement of content items. For example, users can tag digital photos with information to help categorize the digital photos. In one or more embodiments, the user can tag content items with a label using content navigation system 100. For example, and as illustrated in FIG. 8D, a user has tagged content items with the tags Wedding 860k, Graduation 860i, 25th Birthday 860m, and Vacation 860n. Thus, FIG. 8D illustrates that scroll element 806 can allow a user to navigate through content items based on a user assigned tag.

In one or more embodiments of navigation system 100, the user can select and/or switch between different "modes" that arrange the content items of a collection in various ways. For example, a user may want to look for a digital photo that the user knows was taken on a particular date. In that case the user can select to navigate in a timeline mode, illustrated in FIG. 3A. The user, however, may not always know the date on which a digital photo was taken. However, the user may know the person that was in a digital photo that the user wants to find. In such a case, the user can choose to navigate in person mode, as illustrated in FIG. 8A. In another instance, however, the user may only know that the sought after digital photo was taken in New York. In that case the user can select to navigate in a location mode, as illustrated in FIG. 8B. FIGS. 8C and 8D illustrate examples of file type mode and tag mode, respectively, and selected by a user to help the user locate a particular content item based on the information the user knows about the content item.

Figure 9:
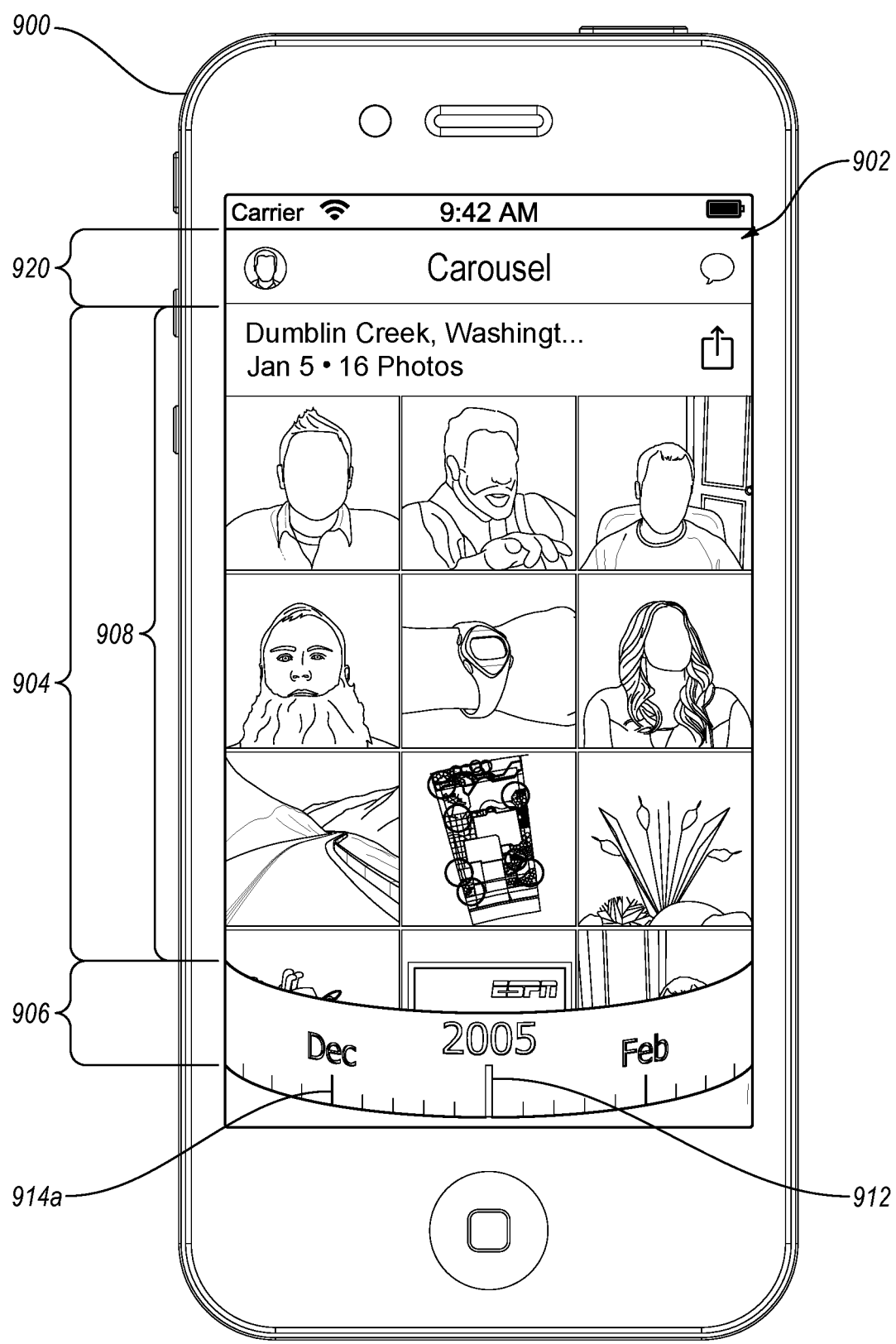
FIG. 9 illustrates a graphical user interface for a content navigation system having a scroll element in accordance with one or more embodiments.

In one or more embodiments, a scroll element can have various experience characteristics to enhance the user experience. For example, FIG. 9 illustrates computing device 900 having a touchscreen 902 that displays a user interface including view area 904, scroll element 906, and header 920. As illustrated in FIG. 9, scroll element 906 can have a rounded 3D type configuration that can allow the user to sense that he is spinning scroll element 906 in a circular fashion, e.g., like a carousel. Scroll element 906 can have one or more of the additional features discussed above with other embodiments of a scroll element.

For example, a user can use scroll element 906 to randomly select photos to view. For example, a user can provide a quick swipe gesture across scroll element 906. Upon user input detector 104 detecting the quick swipe gesture, user interface provider 102 can randomly select a photo from within the collection of content items. In this way, the navigation system 200 can provide yet another way to navigate, browse or otherwise experience the collection of digital content items.

Figure 10:
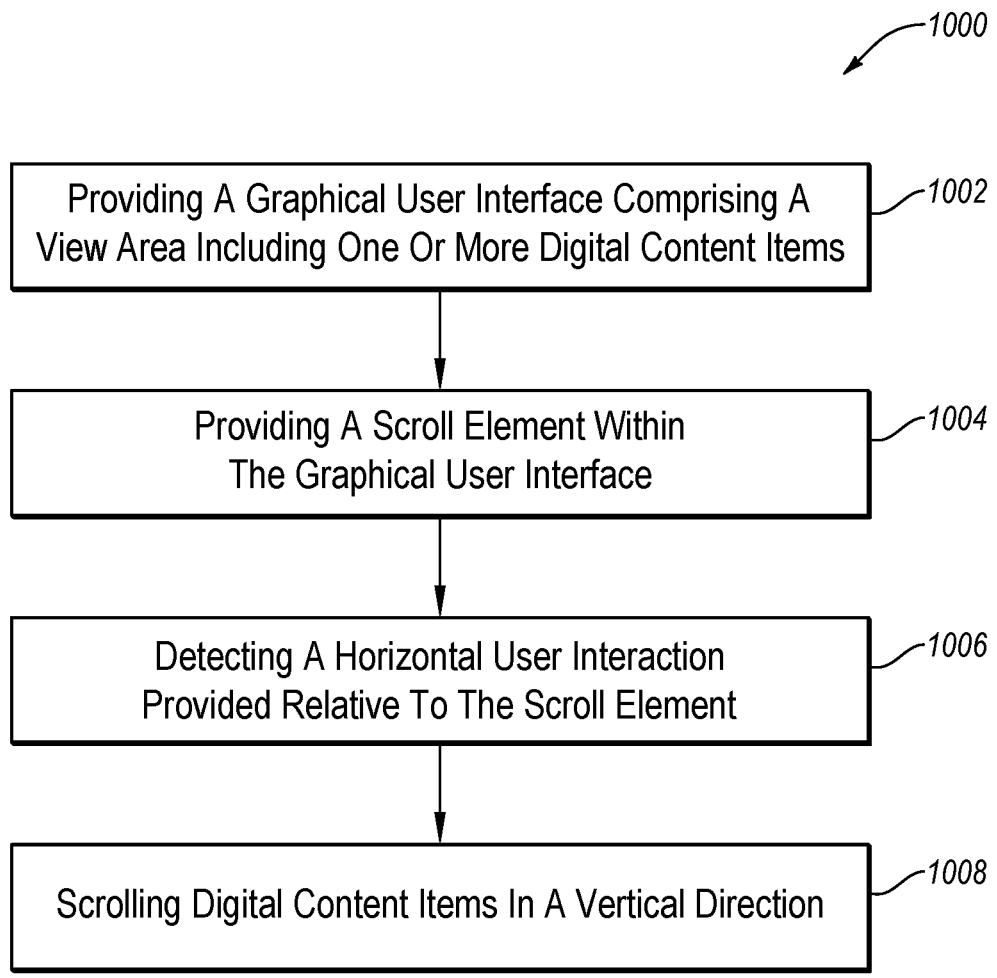
FIG. 10 illustrates a flowchart of a series of acts in a method of navigating a collection of digital content items according to one or more embodiments.
Figure 11:
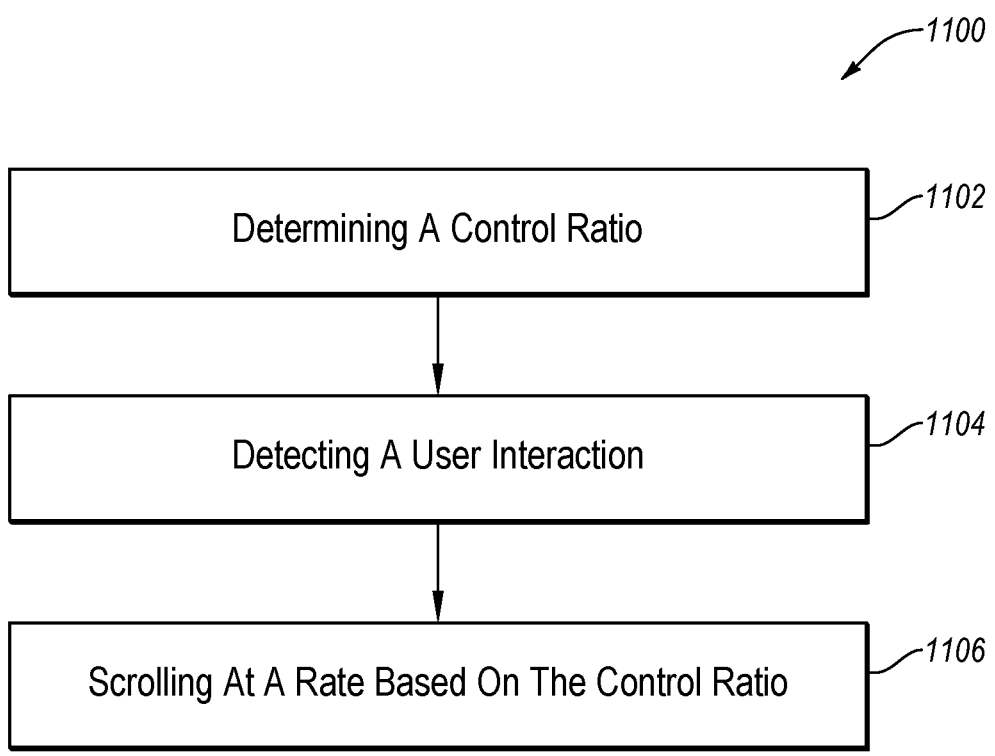
FIG. 11 illustrates a flowchart of a series of acts in another method of navigating a collection of digital content items according to one or more embodiments.

FIGS. 1-9, the corresponding text, and the examples, provide a number of different systems and devices for navigating and browsing through a collection of content items. In addition to the foregoing, embodiments of the present invention also can be described in terms of flowcharts comprising acts and steps in a method for accomplishing a particular result. For example, FIGS. 10 and 11 illustrate flowcharts of exemplary methods in accordance with one or more embodiments of the present invention. The methods described in relation to FIGS. 10 and 11 may be performed with less or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart of one example method 1000 of navigating through a collection of content items. The method 1000 includes an act 1002 of presenting a graphical user interface comprising a view area including one or more of digital content items. For example, act 1002 can include user interface provider 102 providing a user interface that includes view area 304. In addition, act 1002 can include user interface provider 102 arranging a collection of content items for presentation within view area 304. For instance, interface provider 102 can arrange the content items within grid 208 and present a portion of collection grid within view area 304.

In addition, method 1000 further includes an act 1004 of providing a scroll element within the graphical user interface. In particular, act 1004 can include providing, within the graphical user interface, a scroll element that allows a user to scroll through the digital content items. For example, user interface provider 102 can present scroll element 306 within a user interface. Scroll element 306 can include markers 314a, 314b, as well as indicator 312 as discussed above with reference to FIG. 3A.

Method 1000 can additionally include an act 1006 of detecting a horizontal user interaction provided relative to the scroll element. In particular, act 1006 can include detecting, by at least one processor, a horizontal user interaction provided relative to the scroll element. For instance, computing device 300 can include touchscreen 302 by which user input detector 104 can detect the horizontal touch gesture.

Furthermore, the method 1000 can also include an act 1008 of scrolling digital content items in a vertical direction. In particular, act 1008 can include scrolling, in response to the detected horizontal user interaction, digital content items of the collection of digital content items in a vertical direction through the view area. For example, scroll element controller 106 can lookup a configuration associated with scroll element 306 and content items 310. Scroll element controller 106 can then cause user interface provider 102 to scroll the content items at a rate based on the configuration.

Referring now to FIG. 11, a flowchart of another example method 1100 of navigating through a collection of content items is illustrated. As shown, method 1100 can include an act 1102 of determining a control ratio. In particular, act 1102 can include determining a control ratio based on one or more characteristics of a collection of digital content items. For example, based on one or more characteristics of a collection of content items, scroll element controller 106 can determine a control ratio. For instance, the larger the collection of content items, the larger the control ratio.

The method 1100 can also include an act 1104 of detecting a user interaction. In particular, act 1104 can include detecting a user interaction provided relative to a scroll element presented within a graphical user interface. In particular, act 1104 can include detecting a horizontal touch gesture provided by a user relative to scroll element 304. For instance, computing device 300 can include touchscreen 302 by which user input detector 104 can detect the horizontal touch gesture.

Additionally, the method 1100 can include an act 1106 of scrolling at a rate based on the control ratio. In particular, act 1106 can include scrolling the collection of digital content items through a view area within the graphical user interface at a rate based at least in part by the determined control ratio. For example user input detector 104 can determine an input value based on the detected touch gesture. Scroll element controller 106 can scale the user input by using the control ratio, and user interface provider 102 can scroll the content items at a rate determined by the control ratio.

Figure 12:
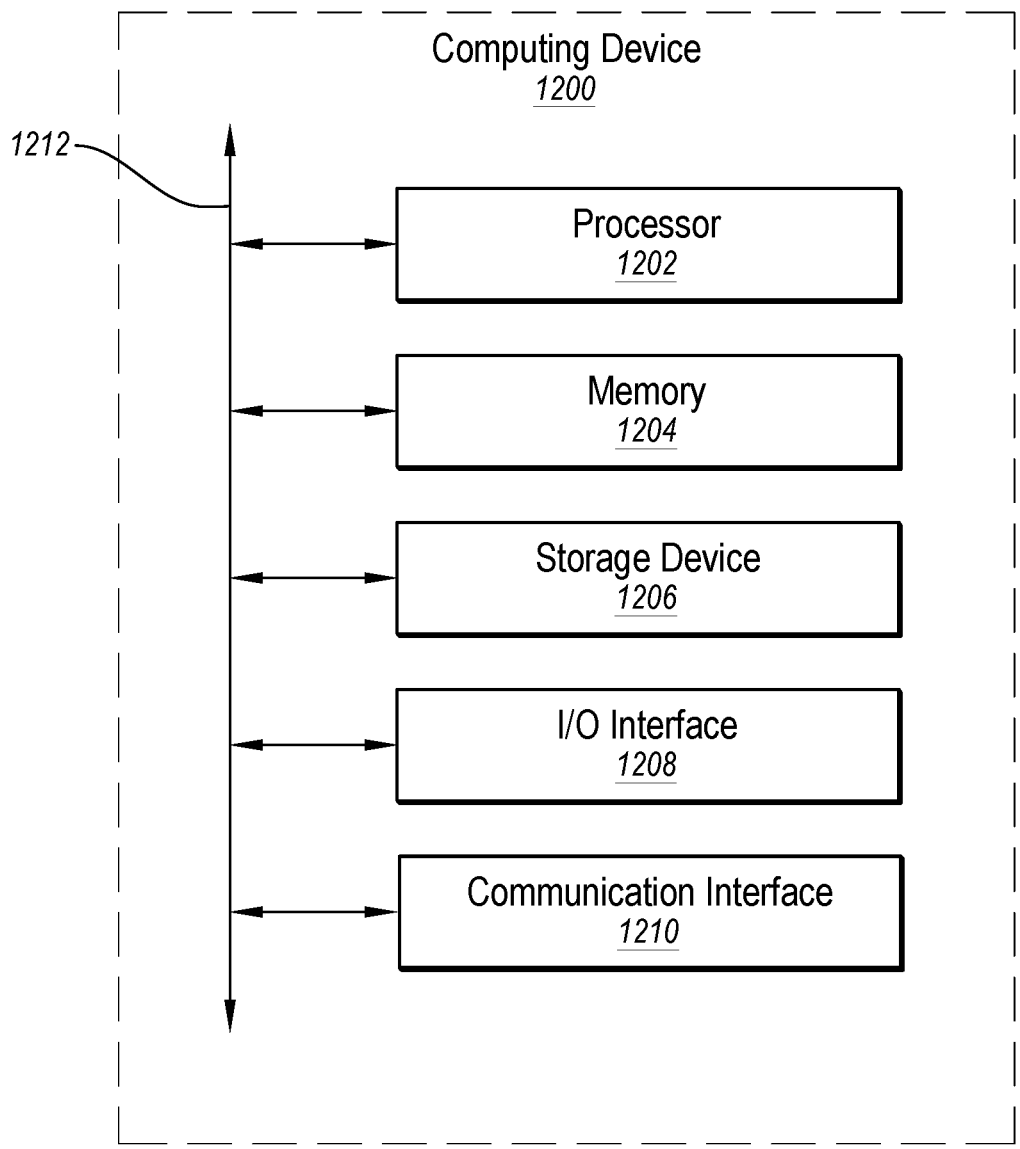
FIG. 12 illustrates a block diagram of a computing device according to one or more embodiments.

FIG. 12 illustrates, in block diagram form, an exemplary computing device 1200 that may be configured to perform one or more of the processes described above. In particular, the computing devices 200, 300, 400, 500, 600, 700, 800, and 900 can comprise the components of computing device 1200. As shown by FIG. 12, the computing device can comprise a processor 1202, a memory 1204, a storage device 1206, an I/O interface 1208, and a communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular embodiments, processor 1202 may include one or more internal caches for data, instructions, or addresses. As an example and not by way of limitation, processor 1202 may include one or more instruction caches, one or more data caches, and one or more translation lookaside buffers (TLBs). Instructions in the instruction caches may be copies of instructions in memory 1204 or storage 1106.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular embodiments, storage device 1206 is non-volatile, solid-state memory. In other embodiments, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
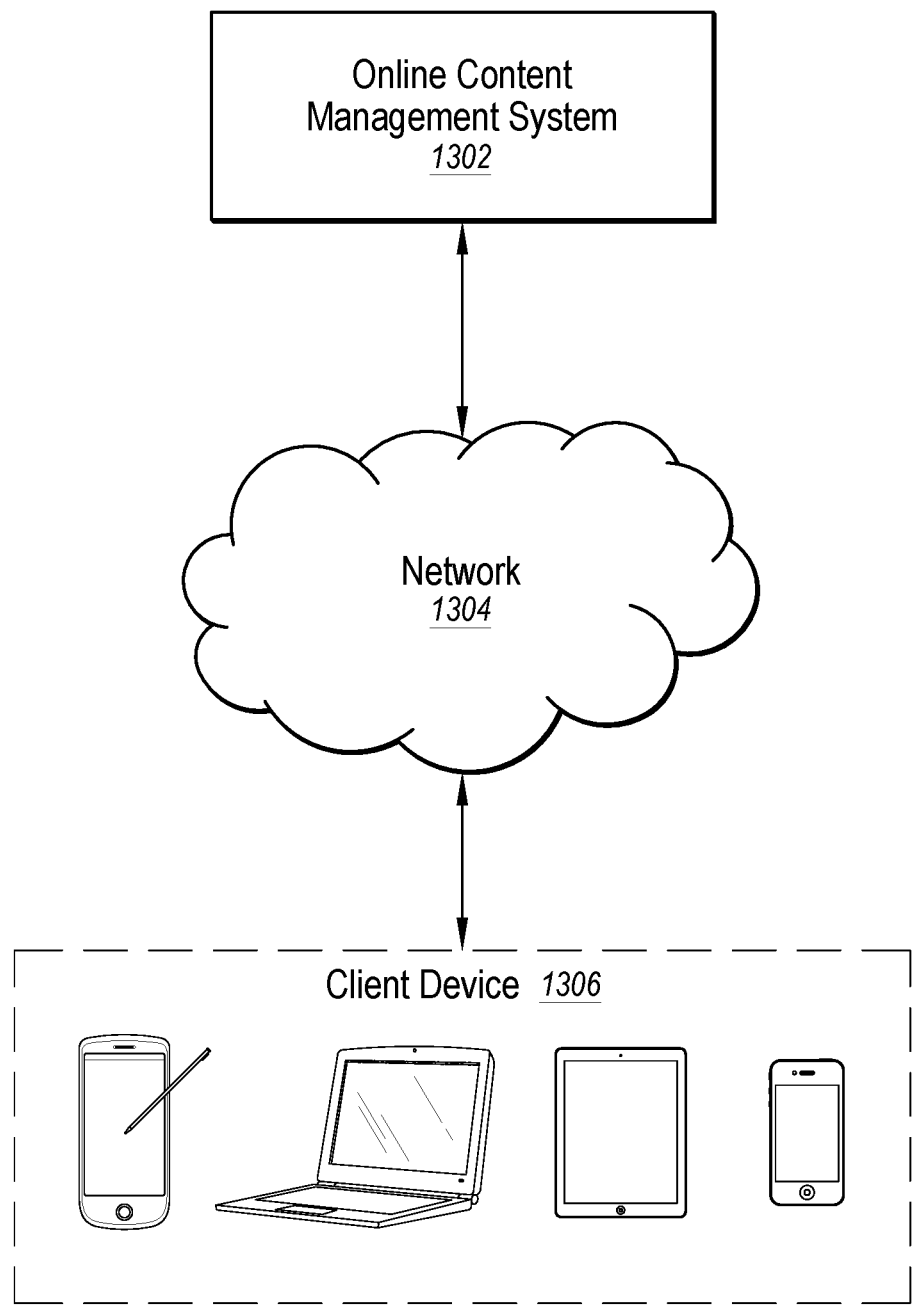
FIG. 13 illustrates a network environment of an online content management system according one or more embodiments.

FIG. 13 is a schematic diagram illustrating an environment within which one or more embodiments of a content navigation system can be implemented. Online content management system 1302 may generate, store, manage, receive, and send digital content items. For example, online content management system 1302 may send and receive content items to and from client devices 1306 by way of network 1304. In particular, online content management system 1302 can store and manage a collection of content items. Online content management system 1302 can manage the sharing of content items between computing devices associated with a plurality of users. For instance, online content management system 1302 can facilitate a user sharing a content item with another user of the online content management system.

In particular, online content management system 1302 can manage synchronizing content items across multiple client devices 1306 associated with one or more users. For example, user may edit a content item using client devices 1306. The online content management system 1302 can cause client device 1306 to send the edited content item to online content management system 1302. Online content management system 1302 then synchronizes the edited content item on one or more additional computing devices.

In addition to synchronizing content items across multiple devices, one or more embodiments of the online content management system can provide an efficient storage option for users that have large collections of content items. For example, the online content management system can store a collection of content items on online content management system 1302, while the client device 1306 only stores reduced-sized versions of the content items. A user can navigate and browse the reduced-sized versions (e.g., a thumbnail of a digital photo) of the content items on client device 1306. In particular, one way in which a user can experience content items is to browse the reduced-sized versions of the content items on client device 1306.

Another way in which a user can experience the content items is to select a reduced-size version of a content item to request the full-size version of the content item from online content management system 1302. In particular, upon a user selecting a reduced-sized version of a content item, client device 1306 sends a request to online content management system 1302 requesting the content item associated with the reduced-sized version of the content item. Online content management system 1302 can respond to the request by sending the content item to client device 1306. Client device 1302, upon receiving the content item, can then present the content item to the user. In this way, a user can have access to large collections of content items while minimizing the amount of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access online content management system 1302.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
providing, for display on a touchscreen, a graphical user interface comprising a view area for displaying a collection of digital content items;
detecting a first user interaction with a scroll element within the graphical user interface;
scrolling, in response to the first user interaction, the collection of digital content items in a vertical direction through the view area at a first scroll rate based on a first scrolling ratio corresponding to the scroll element, wherein the first scrolling ratio is a constant value corresponding to a size range of the collection of digital content items, and wherein the first scrolling ratio reflects a first scaling applied to a measurement associated with the first user interaction to determine the first scroll rate;
detecting a second user interaction within the view area of the graphical user interface, wherein the view area is different than the scroll element within the graphical user interface; and
scrolling, in response to the second user interaction, the collection of digital content items in a vertical direction through the view area at a second scroll rate based on a second scrolling ratio corresponding to the view area, the second scrolling ratio being different than the first scrolling ratio, wherein the second scrolling ratio reflects a second scaling applied to a measurement associated with the second user interaction to determine the second scroll rate.

2. The method of claim 1, further comprising determining the first scroll rate based on amplifying the first user interaction, wherein amplifying the first user interaction is based on the first scrolling ratio being a number greater than one.

3. The method of claim 1, wherein:
the collection of digital content items includes digital images arranged in a plurality of grid units of a scrollable grid; and
the size range of the collection of digital content items corresponds to a range count of the digital images arranged in the plurality of grid units of the scrollable grid.

4. The method of claim 1, further comprising:
identifying an amount of digital content items within the collection of digital content items; and
determining the first scrolling ratio is the constant value based on the amount of digital content items within the collection of digital content items corresponding to the size range of the collection of digital content items.

5. The method of claim 1, wherein the first scrolling ratio is adjustable in a step-wise fashion such that:
the first scrolling ratio is a first constant value when the size range of the collection of digital content items corresponds to a first size range of the collection of digital content items; and
the first scrolling ratio is a second constant value when the size range of the collection of digital content items corresponds to a second size range of the collection of digital content items.

6. The method of claim 1, further comprising:
detecting a new amount of digital content items within the collection of digital content items;
identifying the new amount of digital content items within the collection of digital content items corresponds to the size range of the collection of digital content items; and
maintaining the first scrolling ratio at the constant value.

7. The method of claim 1, further comprising:
detecting a new amount of digital content items within the collection of digital content items;
identifying the new amount of digital content items within the collection of digital content items corresponds to an additional size range of the collection of digital content items; and
modifying the first scrolling ratio to an additional constant value corresponding to the additional size range of the collection of digital content items.

8. The method of claim 1, further comprising:
hiding, from display within the view area, a plurality of digital content items within the collection of digital content items;
providing, for display within the view area, a numerical indicator representing a quantity of digital content items of the plurality of digital content items that are hidden from the view area; and
in response to receiving an indication of a user interaction with the numerical indicator, causing the view area to expand for unhiding the plurality of digital content items.

9. The method of claim 1, wherein:
the first user interaction is a horizontal user interaction and the scroll element is a horizontal linear scroll element; and the second user interaction is a vertical user interaction within the view area of the graphical user interface.

10. A mobile device comprising:
at least one processor; and
at least one non-transitory computer readable storage medium storing instructions thereon that, when executed by the at least one processor, cause the mobile device to:
provide, for display on a touchscreen, a graphical user interface comprising a view area for displaying a collection of digital content items;
detect a first user interaction with a scroll element within the graphical user interface;
scroll, in response to the first user interaction, the collection of digital content items in a vertical direction through the view area at a first scroll rate based on a first scrolling ratio corresponding to the scroll element, wherein the first scrolling ratio is a constant value corresponding to a size range of the collection of digital content items, and wherein the first scrolling ratio reflects a first scaling applied to a measurement associated with the first user interaction to determine the first scroll rate;
detect a second user interaction within the view area of the graphical user interface, wherein the view area is different than the scroll element within the graphical user interface; and
scroll, in response to the second user interaction, the collection of digital content items in a vertical direction through the view area at a second scroll rate based on a second scrolling ratio corresponding to the view area, the second scrolling ratio being different than the first scrolling ratio, wherein the second scrolling ratio reflects a second scaling applied to a measurement associated with the second user interaction to determine the second scroll rate.

11. The mobile device of claim 10, further comprising instructions that, when executed by the at least one processor, cause the mobile device to determine the first scroll rate based on amplifying the first user interaction, wherein amplifying the first user interaction is based on the first scrolling ratio being a number greater than one.

12. The mobile device of claim 10, wherein the first scrolling ratio is adjustable in a step-wise fashion such that:
the first scrolling ratio is a first constant value when the size range of the collection of digital content items corresponds to a first size range of the collection of digital content items; and
the first scrolling ratio is a second constant value when the size range of the collection of digital content items corresponds to a second size range of the collection of digital content items.

13. The mobile device of claim 10, further comprising instructions that, when executed by the at least one processor, cause the mobile device to:
identify an amount of digital content items within the collection of digital content items; and
determine the first scrolling ratio is the constant value based on the amount of digital content items within the collection of digital content items corresponding to the size range of the collection of digital content items.

14. The mobile device of claim 10, further comprising instructions that, when executed by the at least one processor, cause the mobile device to:
detect a new amount of digital content items within the collection of digital content items;

identify the new amount of digital content items within the collection of digital content items corresponds to the size range of the collection of digital content items; and maintain the first scrolling ratio at the constant value.

15. The mobile device of claim 10, further comprising instructions that, when executed by the at least one processor, cause the mobile device to:
 detect a new amount of digital content items within the collection of digital content items;
 identify the new amount of digital content items within the collection of digital content items corresponds to an additional size range of the collection of digital content items; and
 modify the first scrolling ratio to an additional constant value corresponding to the additional size range of the collection of digital content items.

16. The mobile device of claim 10, further comprising instructions that, when executed by the at least one processor, cause the mobile device to:
 hide, from display within the view area, a plurality of digital content items within the collection of digital content items;
 provide, for display within the view area, a numerical indicator representing a quantity of digital content items of the plurality of digital content items that are hidden from the view area; and
 in response to receiving an indication of a user interaction with the numerical indicator, cause the view area to expand for unhiding the plurality of digital content items.

17. A non-transitory computer readable medium comprising instructions that, when executed by at least one processor, cause a computer device to:
 provide, for display on a touchscreen, a graphical user interface comprising a view area for displaying a collection of digital content items;
 detect a first user interaction with a scroll element within the graphical user interface;
 scroll, in response to the first user interaction, the collection of digital content items in a vertical direction through the view area at a first scroll rate based on a first scrolling ratio corresponding to the scroll element, wherein the first scrolling ratio is a constant value corresponding to a size range of the collection of digital content items, and wherein the first scrolling ratio reflects a first scaling applied to a measurement associated with the first user interaction to determine the first scroll rate;
 detect a second user interaction within the view area of the graphical user interface, wherein the view area is different than the scroll element within the graphical user interface; and
 scroll, in response to the second user interaction, the collection of digital content items in a vertical direction through the view area at a second scroll rate based on a second scrolling ratio corresponding to the view area, the second scrolling ratio being different than the first scrolling ratio, wherein the second scrolling ratio reflects a second scaling applied to a measurement associated with the second user interaction to determine the second scroll rate.

18. The non-transitory computer readable medium as recited in claim 17, wherein the first scrolling ratio is adjustable in a step-wise fashion such that:
 the first scrolling ratio is a first constant value when the size range of the collection of digital content items corresponds to a first size range of the collection of digital content items; and
 the first scrolling ratio is a second constant value when the size range of the collection of digital content items corresponds to a second size range of the collection of digital content items.

19. The non-transitory computer readable medium as recited in claim 17, wherein:
 the collection of digital content items includes digital images arranged in a plurality of grid units of a scrollable grid; and
 the size range of the collection of digital content items corresponds to a range count of the digital images arranged in the plurality of grid units of the scrollable grid.

20. The non-transitory computer readable medium as recited in claim 17, further comprising instructions that, when executed by the at least one processor, cause the computer device to:
 hide, from display within the view area, a plurality of digital content items within the collection of digital content items;
 provide, for display within the view area, a numerical indicator representing a quantity of digital content items of the plurality of digital content items that are hidden from the view area; and
 in response to receiving an indication of a user interaction with the numerical indicator, cause the view area to expand for unhiding the plurality of digital content items.

* * * * *